(12) United States Patent
Okada et al.

(10) Patent No.: US 8,275,241 B2
(45) Date of Patent: Sep. 25, 2012

(54) DATA MANAGEMENT DEVICE AND METHOD FOR MANAGING RECORDING MEDIUM

(75) Inventors: Shunji Okada, Kanagawa (JP); Ryogo Ito, Tokyo (JP)

(73) Assignee: Sony Corporation (JP)

( * ) Notice: Subject to any disclaimer, the term of this patent is extended or adjusted under 35 U.S.C. 154(b) by 1199 days.

(21) Appl. No.: 11/546,155

(22) Filed: Oct. 11, 2006

(65) Prior Publication Data

US 2007/0174545 A1   Jul. 26, 2007

(30) Foreign Application Priority Data

Oct. 12, 2005 (JP) ................. P2005-298056

(51) Int. Cl.
H04N 9/80 (2006.01)
(52) U.S. Cl. .................. 386/241; 386/242; 386/329
(58) Field of Classification Search .............. 386/45, 386/46, 95–96
See application file for complete search history.

(56) References Cited

U.S. PATENT DOCUMENTS

| | | | | |
|---|---|---|---|---|
| 6,185,666 | B1 * | 2/2001 | Murray et al. | 711/173 |
| 6,259,858 | B1 * | 7/2001 | Ando et al. | 386/241 |
| 6,308,005 | B1 * | 10/2001 | Ando et al. | 386/241 |
| 6,904,227 | B1 | 6/2005 | Yamamoto et al. | |
| 7,474,112 | B2 * | 1/2009 | Wills | 324/750.3 |
| 7,587,127 | B2 * | 9/2009 | Ando et al. | 386/329 |
| 2003/0018892 | A1 * | 1/2003 | Tello | 713/164 |

FOREIGN PATENT DOCUMENTS

| | | |
|---|---|---|
| EP | 1209556 A2 | 5/2002 |
| JP | 07152491 A | 6/1995 |
| JP | 09062463 A | 3/1997 |
| JP | 09179758 A | 7/1997 |
| JP | 2004030232 A | 1/2004 |
| JP | 2004171626 A | 6/2004 |
| JP | 2004199209 A | 7/2004 |
| JP | 2004-348195 A | 12/2004 |
| JP | 2005044400 A | 2/2005 |
| JP | 2005158151 A | 6/2005 |
| JP | 2005244524 A | 9/2005 |
| JP | 2005275451 A | 10/2005 |
| JP | 2005352898 A | 12/2005 |

OTHER PUBLICATIONS

European Search Report, EP 06255174, dated May 29, 2009.
Office Action from Japanese Application No. 2005-298056, dated May 17, 2011.
Shinji Furuya, etc., A parallel media server using FC—AL and the implementation of an autonomous common resource management mechanism, Institute of Electronics, Information and Communication Engineers technology memoir, Japan, Aug. 4, 1999, vol. 99 No. 251, pp. 95-101.
Office Action from Japanese Application No. 2005-298056, dated Jan. 17, 2012.

* cited by examiner

*Primary Examiner* — Jamie Atala
(74) *Attorney, Agent, or Firm* — Lerner, David, Littenberg, Krumholz & Mentlik, LLP

(57) ABSTRACT

A data management device manages a recording medium, on which a partition table having information regarding a partition is recorded and on which a plurality of drives are assigned using partition description, by referring to the partition table. The plurality of drives include a recording drive on which a basic playback unit included in a file is recorded and a management drive on which a property file having access information for the basic playback unit is recorded. The data management device includes an accessing section for accessing the basic playback unit included in the file recorded on the recording drive by referring to the property file recorded on the management drive.

11 Claims, 19 Drawing Sheets

FIG. 1
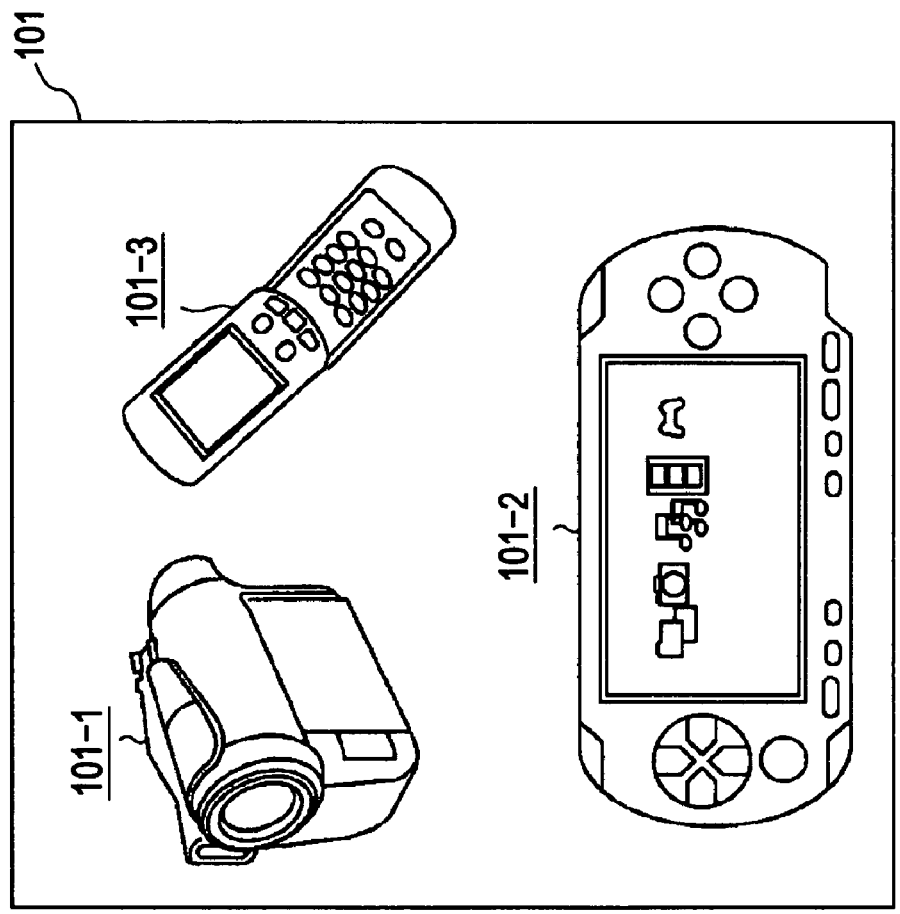
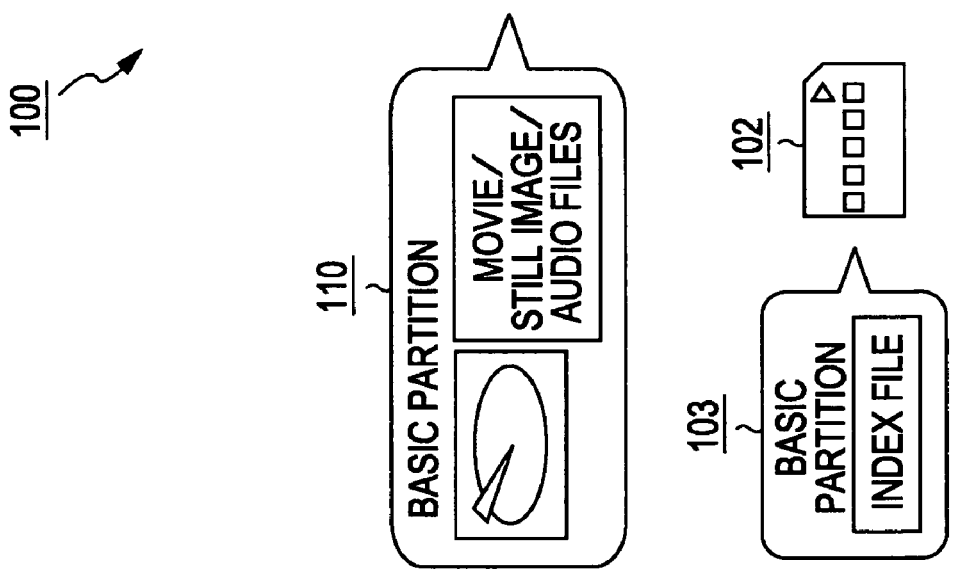

DATA MANAGEMENT DEVICE AND METHOD FOR MANAGING RECORDING MEDIUM

CROSS-REFERENCE TO RELATED APPLICATIONS

The present application claims priority from Japanese Patent Application No. JP 2005-298056 filed on Oct. 12, 2005, the disclosure of which is hereby incorporated by reference herein.

BACKGROUND OF THE INVENTION

1. Field of the Invention

The present invention relates to a data management device that manages a recording medium by recording a partition table having information regarding a partition and referring to the partition table, and to a method for managing a recording medium.

2. Description of the Related Art

Hard disks are widely utilized as mass auxiliary storage devices. A medium format adopted by hard disks and semiconductor memories, different from many other disk systems, provides a function of dividing a physical drive into a plurality of partitions and using the plurality of partitions. Partition tables hold information regarding partitions in the hard disks. The partition tables reside in an area referred to as a master boot record (MBR) located in a first physical sector (i.e., 512-byte area) of the hard disks.

When hard disks have a capacity of 2 terabytes (TB) or more, partitions may not be formed using known partition tables. Accordingly, a technique (see, for example, Japanese Unexamined Patent Application Publication No. 2004-348195) has been suggested. In this known technique, whether or not partitions are formed in an area having a capacity of 2 TB or more is checked. If the partitions are formed in the area having a capacity of 2 TB or more, an area storing parameters in the CHS (Cylinder/Head/Sector) format is treated as an extended area storing parameters in the LBA (Logical Block Addressing) format. Accordingly, the size of the area storing the parameters in the LBA format is virtually extended by 3 bytes.

A technique described in the above-cited patent document works without problems between systems compatible with the technique. However, systems incompatible with the technique described in the patent document (hereinafter, referred to as "existing systems") are incapable of recognizing an extended partition, which leads to inefficient utilization of the extended partition.

In addition, when many users share a hard disk having a capacity exceeding 2 TB, use of an interface that all users are used to is desirable. In particular, when a mass storage system is constructed by connecting a plurality of hard disks, it is desirable to provide a mechanism for managing the plurality of hard disks in an integrated fashion.

SUMMARY OF THE INVENTION

Embodiments of the present invention are made in view of the above-described disadvantages. An embodiment of the present invention provides a data management device and a method for managing a recording medium that manage accessing of data recorded on a recording medium having a basic partition based on a management file recorded on a different removable recording medium.

Additionally, an embodiment of the present invention provides a data management device that manages data shared over a wide area network and data recorded on an external recording medium in an integrated fashion.

Furthermore, an embodiment of the present invention provides a data management device and a method for managing a recording medium that manage data recorded on an extended partition in a hard disk having a basic partition table and an extended partition table even if the device and the method are incompatible with the extended partition format. The basic partition table holds the start address of a partition and the size of the partition. The extended partition table holds an extended storage area of the start address and the partition size of the basic partition table.

To this end, a data management device is provided for managing a recording medium recorded with a partition table having information regarding a partition by referring to the partition table. A plurality of drives are assigned to the recording medium, including a recording drive recorded with a basic playback unit included in a file and a management drive recorded with a property file having access information for the basic playback unit. The data management device accesses the basic playback unit recorded on the recording drive by referring to the property file recorded on the management drive.

According to an embodiment of the present invention, a recording medium recorded with a partition table having information regarding a partition is managed by referring to the partition table. A basic playback unit included in a file is recorded on a recording drive and a property file having access information for the basic playback unit is recorded on a management drive. The file recorded on the recording drive is accessed with reference to the property file. Thus, the file residing in a different drive can be accessed.

According to an embodiment of the present invention, a recording medium recorded with a partition table having information regarding a partition is managed by referring to the partition table. A basic partition and an extended partition are formed on the recording medium using a partition description. A property file having access information for a basic playback unit included in a file recorded on the extended partition is recorded on the basic partition. The extended partition includes a mapping section for assigning a logical sector address to the recording medium connected via a network, a network address conversion section for converting address data assigned as the logical sector address into a network address of the recording medium connected via the network, and a chapter address conversion section for converting the access information indicated by the property file into a name of the file and for accessing the basic playback unit. Accordingly, the recording media connected via the network can be virtually used as a drive managed by a single file system.

According to an embodiment of the present invention, a hard disk is divided into a basic partition and an extended partition according to a new method that extends the basic partition. An index file that associates the basic partition and the extended partition is recorded on the basic partition of the hard disk. Accordingly, even a system incompatible with the extended partition format according to the new method can manage the extended partition utilizing the index file recorded on the basic partition.

According to an embodiment of the present invention, contents recorded on a main drive can be freely accessed based on an index file recorded on a removable medium. In addition, when the removable medium is not inserted, the free access of the contents is prevented.

BRIEF DESCRIPTION OF THE DRAWINGS

FIG. 1 is a block diagram showing a configuration of a disk access system according to a first embodiment of the present invention;

DETAILED DESCRIPTION

A disk access system according to a first embodiment of the present invention will be explained below with reference to the accompanying drawings.

Entire System According to First Embodiment

FIG. 1 shows an example of a disk access system 100 adopting an embodiment of the present invention. The disk access system 100 includes a mobile local terminal server 101 and a mass recording medium (e.g., a hard disk, a mass nonvolatile memory, or a flash memory) 110 with a basic partition. Video/audio data files of the local terminal server 101 can be recorded on the recording medium 110. Hereinafter, the recording medium 110 is also referred to as a "hard disk".

Figure 2:
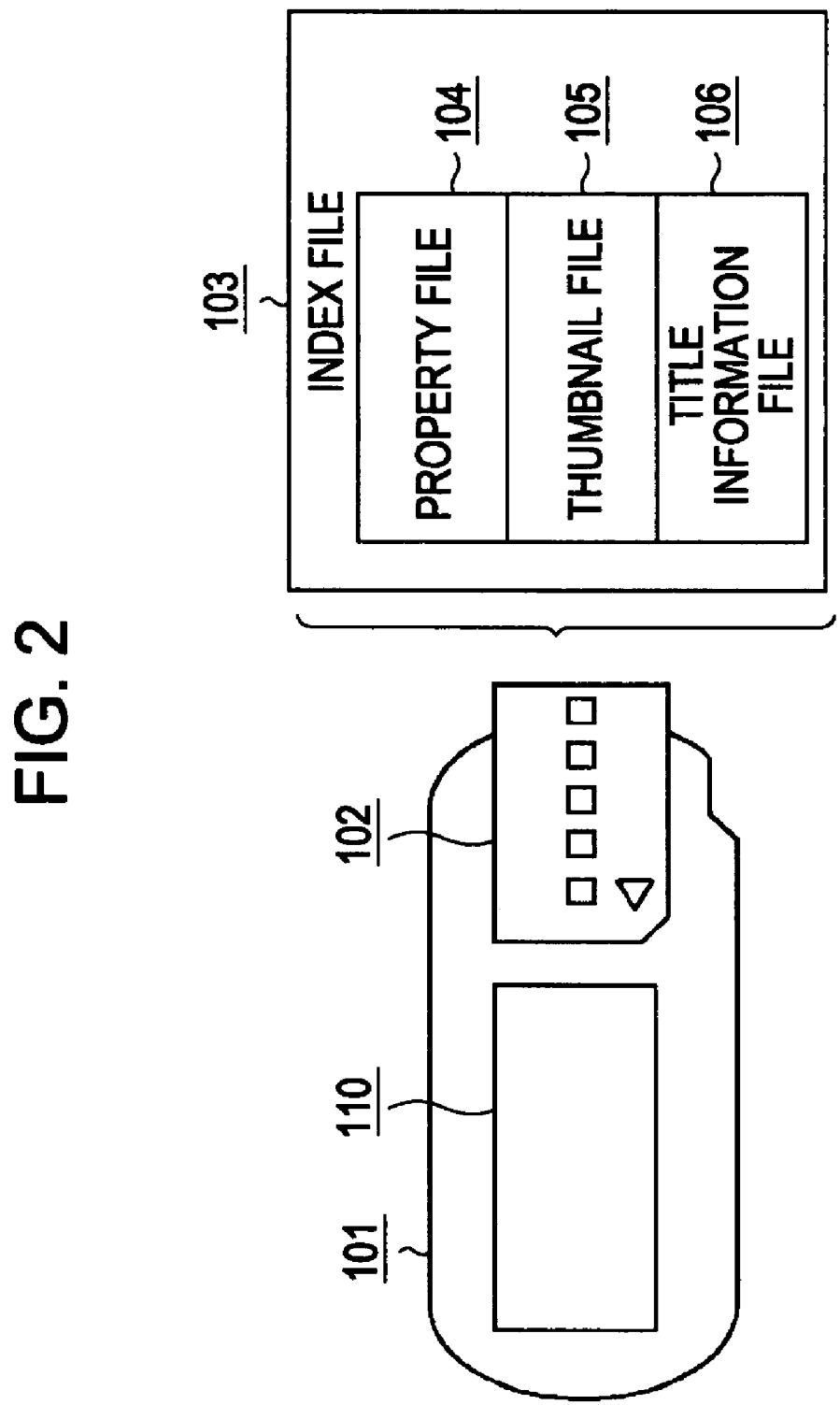
FIG. 2 is a block diagram showing an internal configuration of a local terminal server according to a first embodiment of the present invention.

The local terminal server 101 may be a mobile device such as a camcorder or a digital camera 101-1, a video player 101-2, or a camera-equipped mobile phone 101-3. As shown in FIG. 2, the local terminal server 101 includes a removable semiconductor memory 102. The semiconductor memory 102 is a drive on which a storage partition is formed using the same format as that of an HDD (Hard Disk Drive). The semiconductor memory 102 has an index file 103 recorded thereon that allows accessing of contents recorded on the hard disk 110. Hereinafter, the semiconductor memory 102 is also referred to as a "removable medium".

[Access Scheme of Contents Indicated by Index File]

Figure 3:
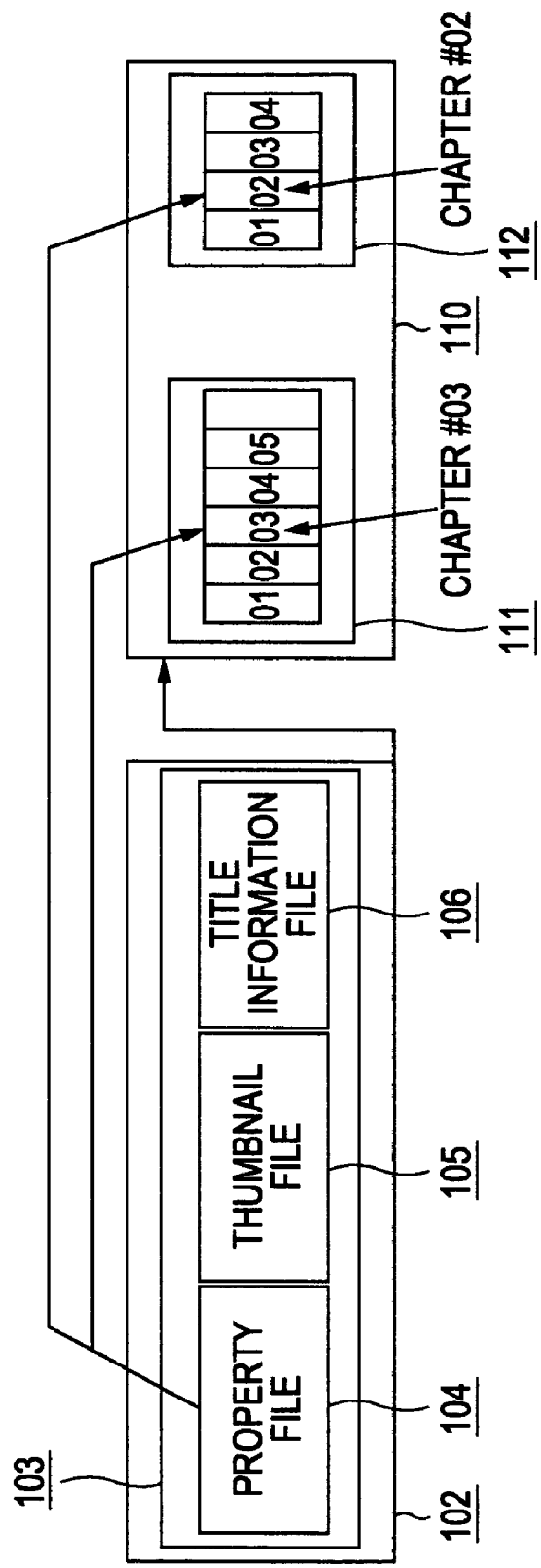
FIG. 3 is a schematic diagram showing a structure of an index file.

As shown in FIG. 3, the index file 103 is composed of three kinds of file, namely, a property file 104, a thumbnail file 105, and a title information file 106. The property file 104 includes entry data for a chapter, which contains information on an entry for a chapter (i.e., a basic playback unit) of each stream file (i.e., a title). The entry information includes a file path of a recorded file and a logical sector number. A drive specification option is described in the property file 104. In the disk access system 100 according to the embodiment of the present invention, the hard disk 110 serves as a recording drive for the local terminal server 101. Files recorded on the recording drive are accessible as files recorded on the local terminal server 101.

[Method for Describing Various File Entries in Property File in Index File]

Now, a description method used within the property file 104 shown in FIG. 3 will be explained. Here, the following explanation is given while assuming the semiconductor memory 102 recording the index file 103 is treated as a "drive #A", whereas the hard disk 110 storing the stream data is treated as a "drive #B". The property file 104 contains file entry information for content files (i.e., stream files) 111 and 112 recorded on the hard disk 110, for the thumbnail file 105, and for the title information file 106. In the first embodiment, since the index of the property file 104 indicates the chapter of the content file, the property file 104 further contains information on chapter numbers. Here, the result of one recording operation (i.e., from the start to the end thereof) is treated as a chapter. When a system is implemented to realize a simple file organization in which one file corresponding to one title contains only one chapter, all specified chapter numbers may be simply described as 01 or the description thereof may be omitted.

The property file 104 contains a title data ID (i.e., a name of a stream file), a chapter number, and a drive letter (e.g., "B:/" herein).

The following description is used to specify a given property file.

{B:/VTS_01_0.MPG,03},
{B:/VTS_02_0.MPG,02}

Alternatively, the following description according to another method of specification may be used

{VTS_01_0.MPG,03}{B},
{VTS_02_0.MPG,02}{B}

Here, "VTS_01_0.MPG" and "VTS_02_0.MPG" are file names indicating the stream files that include the chapters. "03" and "02" indicate the chapter numbers to be accessed. "B:/" or "B" is an optional description indicating the drive.

The property file 104 also contains a description of entry information for the thumbnail file 105. The thumbnail file 105 is used in combination with the property file 104 of the above-described index file 103. Likewise, the entry information for the thumbnail file 105 is described and registered in the property file 104. Suppose that the name of the thumbnail file is, for example, "Index0001.INT". The thumbnail file 105 records a data set of thumbnail images for each specified chapter. The location, the name, and the content of the thumbnail file 105 have to be described in the above-described property file 104, thereby allowing the thumbnail file belonging to the above-described property file 104 to be specified.

To specify the thumbnail file, the property file contains the description of the thumbnail file name, the number of chapter images, and the drive letter. More specifically, the following example description is used in a given property file to specify a thumbnail file residing in the drive #A.

{A:/Index0001.INT,M}
{A:/Index0001.INT,N}

Alternatively, the following description according to another method of specification may be used {Index0001.INT,M,A}
{Index0001.INT,N,A}

Here, "Index0001.INT" corresponds to the name of the thumbnail file. "M" and "N" represent the number of chapter images specified by the index. "A:/" or "A" indicates the drive #A, i.e., the basic partition among the partitions provided in the removable medium 102.

Similarly, the property file 104 contains a description of the file entry information for the title information file 106. The title information file 106 is used in combination with the property file 104. Suppose that the name of the title information file 106 is, for example, "Index0001.INM", which is used when the file entry for the title information file 106 is described and registered in the property file 104.

More specifically, the following example description is used in a given property file to specify a title information file residing in the drive #A.

{A:/Index0001.INM,M}
{A:/Index0001.INM,N}

Alternatively, the following description according to another method of specification may be used.

{Index0001.INM,M,A}
{Index0001.INM,N,A}

The title information file 106 has metainformation such as attribute information and text information regarding the video for each specified chapter.

As shown in FIG. 3, for example, the hard disk 110 records the content files 111 and 112. The content file 111 contains a plurality of chapters including a chapter #03. Similarly, the content file 112 contains a plurality of chapters including a chapter #02.

A chapter in a stream file explained herein indicates a stream data unit from the start to the end of the recording operation of a video stream of, for example, an MPEG (Moving Picture Expert Group) format. More specifically, when one GOP (Group of Pictures) of an MPEG format is considered as one VOBU (Video Object Unit), a chapter corresponds to stream data, recorded from the start to the end of one recording period, composed of a plurality of VOBUs gathered as a continuous stream.

An access process will be explained next. A chapter included in a file residing in another partition of another drive may be specified in the property file 104 of the index file 103 residing in the drive #A having the basic partition. The chapter is specified and described as explained above.

A first chapter specification indicates chapter #03 included in the content file 111 recorded on the drive #B. A second chapter specification indicates chapter #02 included in the content file 112 recorded on the drive #B.

In response to the selection of the thumbnail image in the thumbnail file corresponding to the chapter #03 of the content file 111, the corresponding chapter (i.e., the chapter #03) is specified and accessed according to the property file 104 of the index file 103. More specifically, data located at the starting address of the chapter #03 in the content file 111 recorded on the drive #B is accessed and read out to start a playback operation. In addition, in response to the selection of the thumbnail image in the thumbnail file corresponding to the chapter #02 of the content file 112, the corresponding chapter (i.e., the chapter #02) is specified and accessed according to the property file 104 of the index file 103. More specifically, data located at the starting address of the chapter #02 in the content file 112 recorded on the drive #B is accessed and read out to start a playback operation.

[Creation Operation of Thumbnail File and Title Information File]

Figure 4:
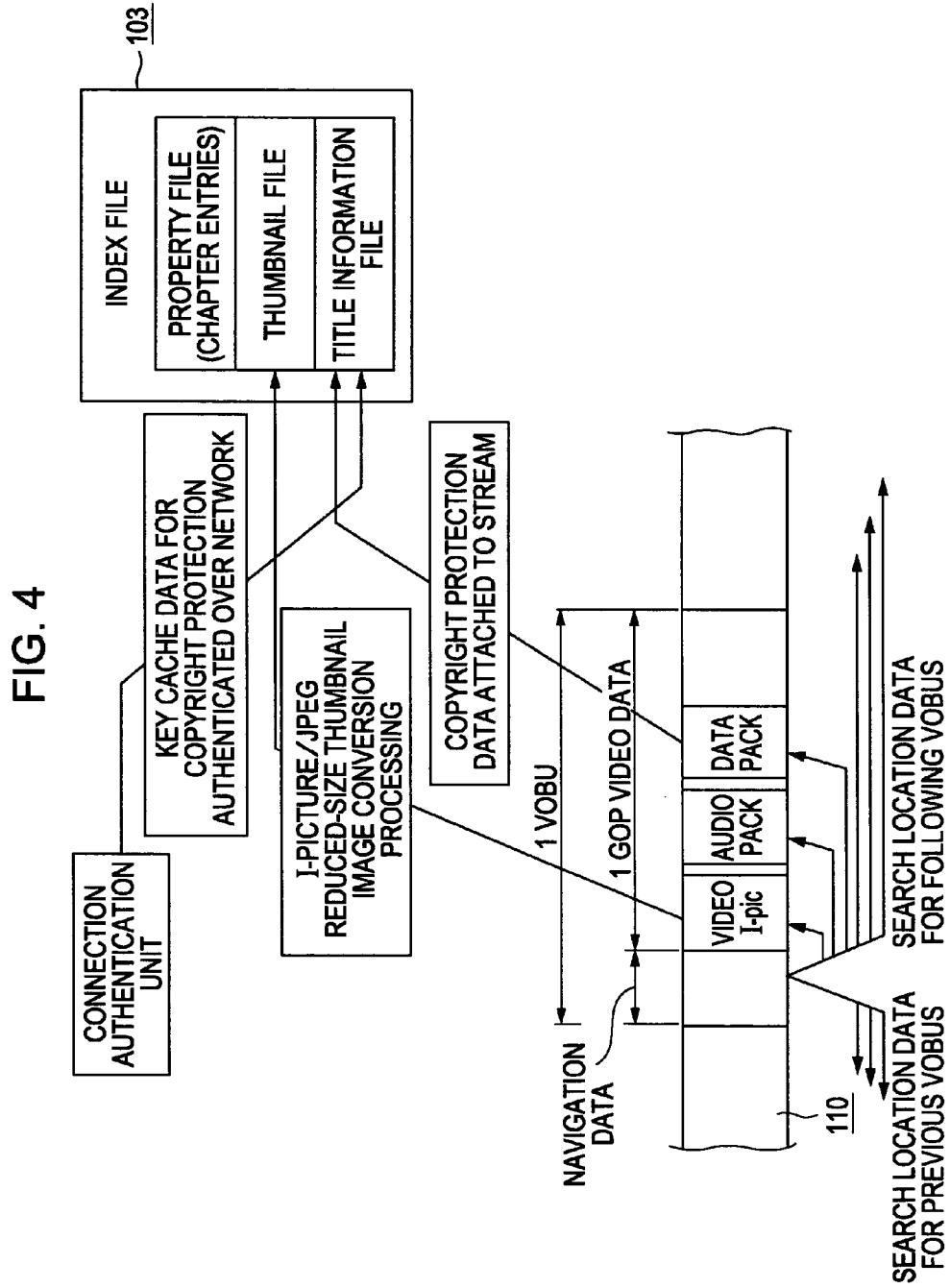
FIG. 4 is an explanatory diagram of a video object unit data of a recorded content stream and property, thumbnail, title information files of an index file.

Referring to FIG. 4, an association between the property file, thumbnail file, and title information file of the index file of a video stream and the attribute information data of the recorded stream data will be explained. The explanation assumes a case where the index file 103 resides in the removable medium 102.

In the video stream file, the minimum playback unit of the MPEG-compressed video/audio data is considered as one video object unit. Herein, the video stream is compressed using the MPEG2 format, which is widely used in hard disks and optical discs, or the MPEG4 format referred to as H264/AVC. In addition, each video object unit contains MPEG data including video data of one GOP (Group of Pictures), corresponding audio data, and stream attribute data. Navigation data is prepended to each video object unit. The navigation data includes location information of an I-picture, the corresponding audio data, and data attached to the GOP. The navigation data further includes location information used for searching for the previous video object units in a playback time axis and location information used for searching for the following video object units in the playback time axis. Such location information is used for fast forward and fast rewind operations, and is contained as the location information relative to the data size of the medium.

The thumbnail file contains the thumbnail image data set indicated by the index file 103 recorded on the removable medium 102. The thumbnail file is updated after a thumbnail image is created from the specified video object included in each stream 110 as a still image. In addition, if valid copyright protection data is attached to the stream (i.e., the title), the title information file is updated. Furthermore, although it is explained below in a second embodiment, if access is authenticated over a network using an authentication key received from a connection authentication unit, the title information file of the index file is updated with the key cache data for the copyright protection.

[Index Synchronization Operation at the Time of Insertion]

Figure 5:
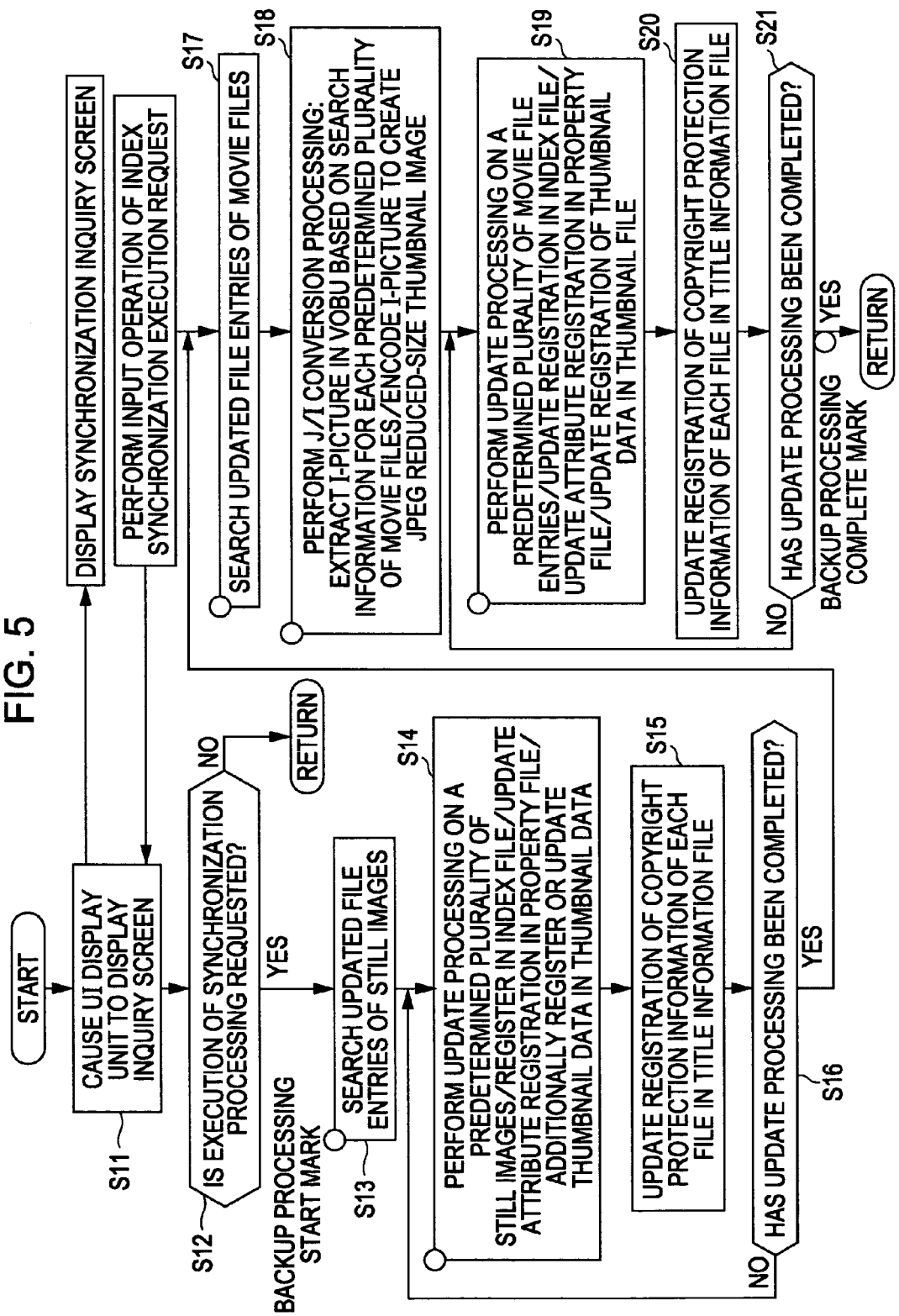
FIG. 5 is a flowchart showing a synchronization operation performed on an index file to synchronize the content of index file with a content file.

Referring to FIG. 5, a synchronization operation of content of the index file will be described. The synchronization operation is performed when the removable medium 102 is inserted in a main body of the local terminal server 101 to synchronize the content of the index data stored in the index file 103 with the content of the stream data stored in the hard disk 110.

Upon insertion of the removable medium 102, the local terminal server 101 starts an update operation of the content of the index file 103 stored therein.

First, the local terminal server 101 controls a user interface (UI) display unit to display an inquiry screen in order to inquire of a user whether or not the user would like execution of the synchronization operation of the index file 103. The user then inputs their decision on the screen, whereby the local terminal server 101 confirms the user's decision (STEP S11).

Upon receiving the input operation of the synchronization operation execution request of the index file 103 (YES at STEP S12), the process proceeds to the next step STEP S13.

If the user does not request the execution of the synchronization operation by the input operation (NO at STEP S12), the local terminal server 101 performs no further steps and the process exits from the operation shown in the flowchart.

If the user requests the execution of the synchronization operation by the input operation, the local terminal server 101 writes a synchronization operation start mark in a nonvolatile memory (e.g., a flash memory) for progress management (not shown) before starting the operation.

The local terminal server 101 first searches for the updated file entries for the still images (STEP S13). If the local terminal server 101 finds any update such as deletion, addition, and image processing editing, the local terminal server 101 accumulates the updated file entries for the still images. The local terminal server 101 collectively performs the update operation on the index file 103 with a predetermined number (e.g., 12) of accumulated file entries. More specifically, the local terminal server 101 registers/updates a compression attribute and a file path in the property files 104 corresponding to the plurality of updated files (STEP S14).

The local terminal server 101 registers/updates the thumbnail file 105 of the index file 103 with Exif (Exchangeable Image File Format) specific attribute information including the compressed thumbnail image data of the still image data as the thumbnail image data. The local terminal server 101 also reads out and obtains protection information and copyright protection information of the still image files, and registers/updates the title information file with the obtained information (STEP S15).

If all of the updated file entries for the still images have not been processed (NO at STEP S16), the process returns to STEP S14. The local terminal server 101 continuously performs the same update operation of the index file 103 on every predetermined number of still image files.

If all of the updated file entries for the still images have been processed (YES at STEP S16), the local terminal server 101 then performs an update operation on the index file 103 of the movie files.

The local terminal server 101 searches for the updated file entries among the chapter entries of the movie files in the index file 103 stored in the inserted removable medium 102. If the local terminal server 101 finds any new update such as deletion, addition, and division, partial deletion, or combination of the files, the local terminal server 101 accumulates the updated file entries for the movies (STEP S17).

The local terminal server 101 collectively performs the update operation on the index file 103 with a predetermined number (e.g., 12) of accumulated file entries. More specifically, the file path to the content file, the chapter position information within the file, and attribute data composed of a compression attribute and a system stream attribute are registered in the property files 104 corresponding to the plurality of updated files (STEP S18). The compression attribute includes information on a video system format such as NTSC (National Television System Committee) or PAL (Phase Alternation by Line) format or a compression format such as MPEG2 or H264/AVC. The system stream attribute includes information on a reset position of SCR (System Clock Reference), a boundary of audio packets, and system stream creation formats that differs among a seamless attribute.

The local terminal server 101 then creates a reduced-size thumbnail image for each video stream file or chapter according to a given still image compression format (e.g., JPEG (Joint Photographic Experts Group) format), and registers the thumbnail image. More specifically, a video object unit (e.g., 1 GOP whose playback time is 0.5 seconds) is specified from the video stream files or the chapters in the video stream file in order to register the thumbnail image. On the basis of the location information obtained from the navigation data prepended to the video object unit, the local terminal server 101 reads out I-picture data of the video stream, and decodes the I-picture using a non-linear quantization table. In particular, for example, in the case of MPEG2 video data, one interlaced field of a non-interlaced frame is read out, and the size of the display image is reduced to the size of the thumbnail image (160×120 pixels). The still image encoding operation is then performed using a linear quantization table. After attaching local timestamp information generated from GST (Greenwich Standard Time) and timezone information, which is the time attribute information of the file, the local terminal server 101 registers/updates the thumbnail file 105 of the index file 103 with the thumbnail image data of the Exif-specific attribute information (STEP S19).

The local terminal server 101 also reads out and obtains file protection information of the storage disk in which the video stream file is stored and attached information for the copyright protection of a server. The local terminal server 101 registers and updates the title information file with the obtained information. More specifically, the file protection information of the storage disk includes information regarding CSS (Content Scramble System), CPRM (Content Protection for Recordable Media), CGMS (Copy Generation Management System) that is included in a vertical blanking interval of an analog video signal, and APS (Analog Protection System) represented by macrovision APS. The copyright protection system for the contents stored in the server on a network includes, for example, DRM (Digital Right Management). In DRM, if a license key for viewing is obtained from a license server at the time of download of a stream from a stream server, the information regarding each license key is registered and updated in the title information file by specifying the content file corresponding to the information (STEP S20).

If all of the updated file entries for the movie files or the chapters have not been processed (NO at STEP S21), the process shifts to STEP S19. The local terminal server 101 continuously performs the same update operation of the index file 103 on every predetermined number of movie files or chapters.

If all of the updated file entries for the movie files or the chapters have been processed (YES at STEP S21), the local terminal server 101 writes an update operation complete mark in the nonvolatile memory, completes and exits from the synchronization operation of the content of the index file.

After the completion of the above-described synchronization operation, multiple screen display of thumbnail images is implemented using the content of the index file stored in the removable medium 102 such as an insertable memory card, thereby implementing the access and viewing of the movie and still image files.

When a long time is unpreferably taken to complete the synchronization operation, and skipping of the encoding operation of the still thumbnail image from the movie file entry or the chapter entry is desired, an alternative operation capable of shortening the time can be provided. In the alternative operation, the local terminal server 101 reads out a data pack on the basis of the navigation data of the specified video object unit indicated by the entry for the stream file or the chapter. The local terminal server 101 then generates the local timestamp information from the GST and timezone information, and registers the local timestamp information in the property file 104. The local terminal server 101 attaches the local timestamp information generated from the GST and timezone information to a plain JPEG dummy thumbnail image (160×120 pixels) commonly used for the movie contents. The local terminal server 101 registers this dummy thumbnail image as the thumbnail data of the Exif-specific attribute information. This operation may be implemented as system software allowing the selection of an alternative operation that shortens the time for the video I-picture decoding and reduced-size still image encoding operation. In such a case, a playback system may read out the timestamp information from the Exif-specific information, and display the timestamp using a balloon while outputting an audio guidance by so as to notify the user about the file information, when a focus is placed on the plain JPEG dummy thumbnail image.

[Explanation of Partition of Recording Medium Managed by Referring to Partition Table]

A detailed explanation is given on a drive option in a medium format of a recording medium managed by referring to a partition table. A master boot record resides in a first sector of the hard disk 110. The master boot record includes descriptive information of the current partition and the next partition that follows the current partition. When the storage space of the hard disk 110 is divided into partitions, the partitions are recognized as different drives. The disk access system 100 adopting the embodiment of the present invention allows access to the internal hard disk 110 using the index file 103 written in the removable medium 102 by describing the drive option information in the index file 103.

Figure 6:
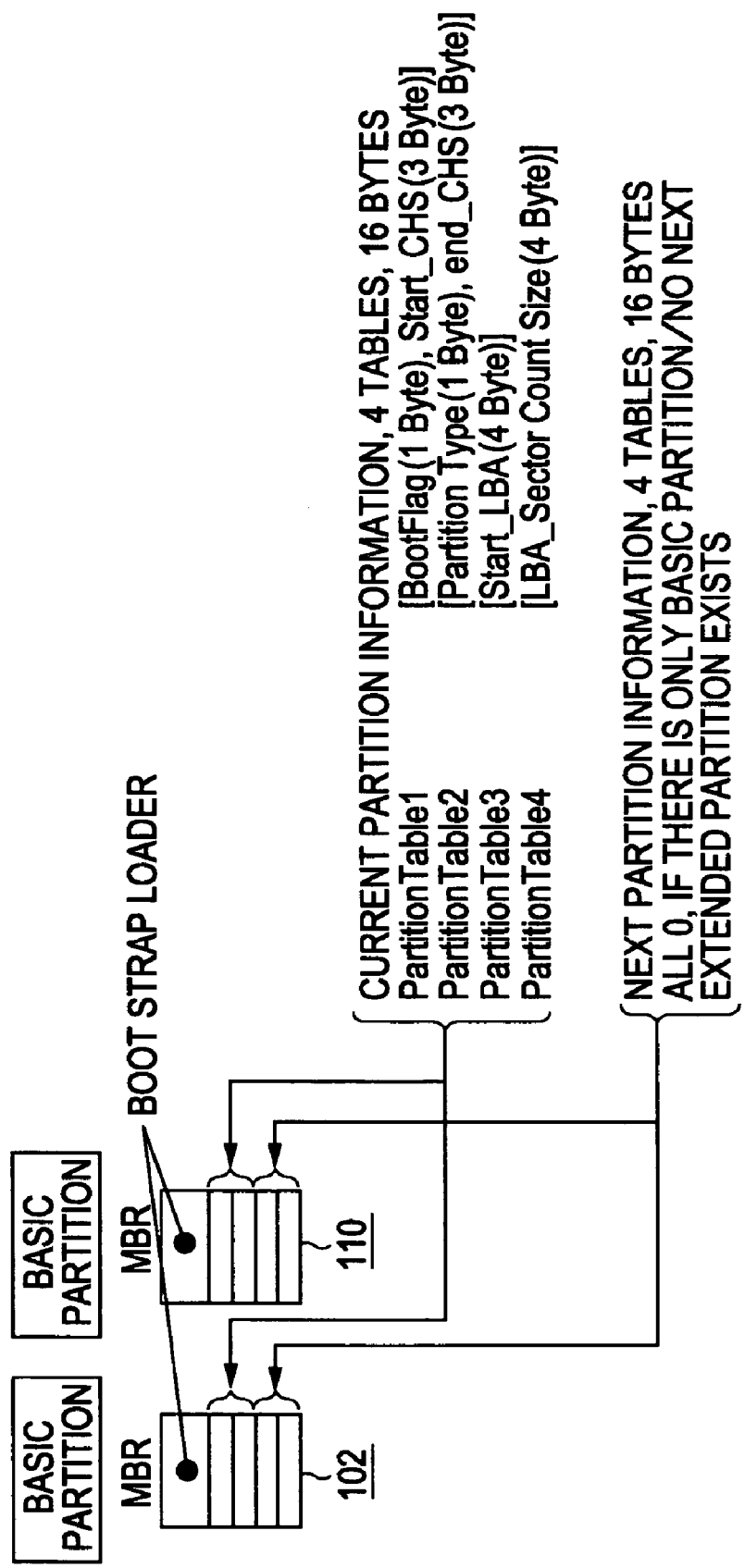
FIG. 6 is a conceptual diagram showing a structure of a partition table.

Now, referring to FIG. 6, an example case in which one basic partition is formed on each of the removable medium 102 and the hard disk 110 will be explained.

In this case, an MBR (master boot record) is placed in a first sector of each basic partition. A bootstrap loader is written at the first part of each MBR. Following the bootstrap loader, four tables having the current partition information and another four tables having the next partition information are written.

The current partition information is composed of four tables, which are 16 bytes long. A partition table 1 includes information on a boot flag (1 byte) and a start CHS (Cylinder/Head/Sector) address (3 bytes). A partition table 2 includes information on a partition type (1 byte) and an end CHS address (3 bytes). A partition table 3 includes information on a start LBA (Logical Block Addressing) address (4 bytes). A partition table 4 includes information on a partition size in the LBA format (4 bytes). For the boot flag (1 byte), 0x01 indicates the partition that can be booted. For the partition type (1 byte), 0x00 indicates an empty (deleted) partition, while 0x01 indicates the current partition, and 0x05 indicates the next partition.

The next partition information is composed of four tables, which are 16 bytes long. Since this example case assumes the combination of the basic partitions, no next extended partition exists. Accordingly, all values of the four tables of the next partition information are set to zero.

The property file 104 of the index file 103 is stored in the basic partition, having the above-described configuration, on the local terminal server 101. The local terminal server 101 accesses the stream data of the stream file stored in the basic partition of the hard disk 110 by the chapter unit on the basis of the property file 104.

Figure 7:
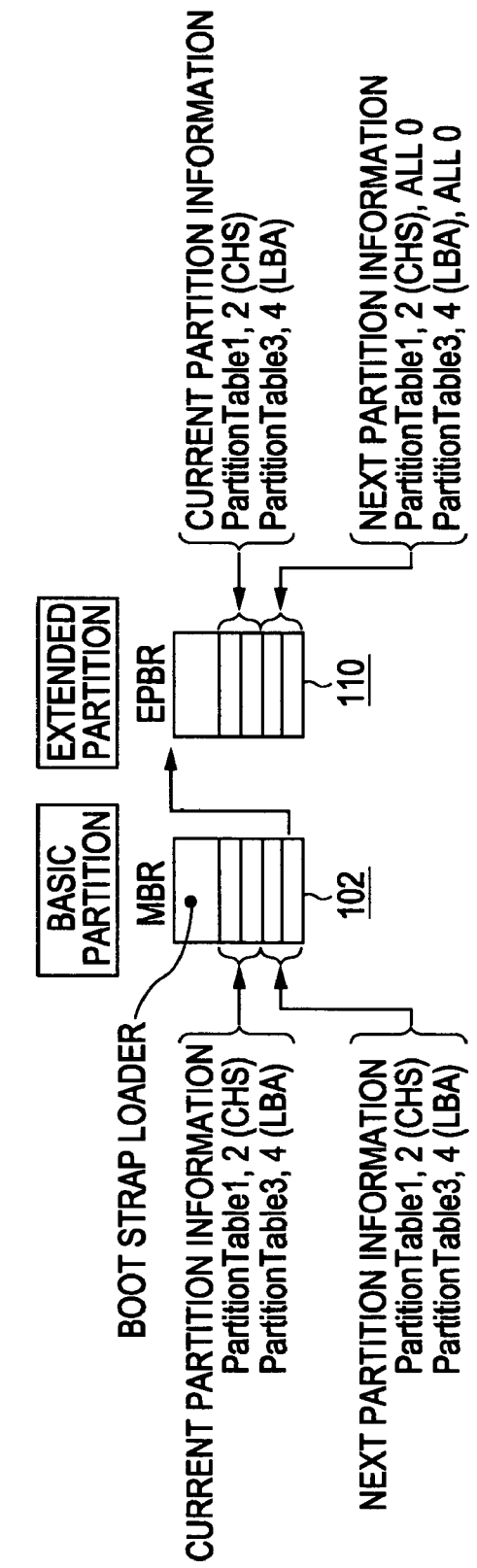
FIG. 7 is a conceptual diagram showing a structure of a partition table when a hard disk is treated as a divided extended partition.

Referring to FIG. 7, an example case in which a basic partition is formed on the local terminal server 101 and an extended partition is formed on the hard disk 110 will be explained next.

In this case, the basic partition includes the MBR. A bootstrap loader is written at the first part of the MBR. Following the bootstrap loader, four tables having the current partition information and another four tables having the next partition information are written.

The current partition information is composed of four tables, which are 16 bytes long. Partition tables 1, 2, 3, and 4 have the same configuration as the basic partition shown in FIG. 6. The next partition information is composed of four tables, which are 16 bytes long. Partition information of the next extended drive is written in partition tables 1, 2, 3, and 4.

The extended partition includes an EPBR (Extended partition Boot Record). The first part of the EPBR includes no bootstrap loader. Following this, four tables having the current partition information and another four tables having the next partition information are written. The current partition information is composed of four tables, which are 16 bytes long. The partition information is written in the partition tables in the same manner as that of the basic partition shown in FIG. 6.

The next partition information is composed of four tables, which are 16 bytes long. In this example case, since no extended partition exists, all values of the four tables are set to zero.

The property file 104 of the index file 103 is stored in the basic partition, having the above-described configuration, on the local terminal server 101. The local terminal server 101 accesses the stream data of the stream file stored in the extended partition of the hard disk 110 by the chapter unit on the basis of the property file 104.

In a second embodiment of the present invention, access to a hard disk having a capacity of 2 terabytes (TB) or more is implemented using an extended partition according to a new method.

If the capacity of the hard disk 110 is 2 TB or more, a partition may not be formed using the above-described partition table. When the partition may not be formed, the drive option may not be set. In order to address this disadvantage, a partition description method described in Japanese Unexamined Patent Application Publication No. 2004-348195 is used.

The recording medium managed by referring to the partition table, different from many other disk systems, has a function of dividing a physical drive into a plurality of partitions and using the partitions. The information regarding the partitions in the hard disk is written in the partition tables included in an area called the master boot record (MBR), which is placed at a first physical sector (i.e., a 512-byte area) of the hard disk.

The partition table has four entries, each of which is 16-bytes long. Since each entry corresponds to one partition, the hard disk can include a maximum of four partitions. Information regarding the partition and the partition type, such as the boot flag (1 byte), the start CHS address (3 bytes), the partition type (1 byte), the end CHS address (3 bytes), the start LBA address (4 bytes), and the partition size (4 bytes), is stored in the entry.

The boot flag is also referred to as a boot indicator or an active flag, and indicates whether or not an operating system can be booted from the partition. Basically, the OS may not be booted from the partition having the unset boot flag (i.e., 0x00).

The partition information is redundant, and is expressed in two formats, i.e., the LBA format and the CHS format. The CHS format uses three (three-dimensional) parameters of CHS (Cylinder/Head/Sector) to express the physical position on the hard disk.

On the other hand, in the LBA format, sequential numbers starting from, for example, 0 (i.e., logical block address) are assigned to each accessible block unit on the storage space of the hard disk. The address (or position) on the storage space of the hard disk is specified by specifying the number. The CHS format has a disadvantage that the partition may not be formed if the capacity of the hard disk exceeds 8 gigabytes (GB). Accordingly, the LBA format has mainly been used recently.

However, the LBA format also has a disadvantage that the partition may not be formed if the capacity of the hard disk exceeds 2 terabytes (TB). The sizes of the storage areas of the start position (i.e., the start address) of the partition and the partition size in the partition table according to the LBA format are set to 4 bytes (i.e., 32 bits). The maximum value representable by 32 bits is $2^{32}-1$ sector (($2^{32}-1$)×512 bytes=approximately 2 TB. Thus, the disadvantage occurs.

As described above, when the capacity of the hard disk exceeds 2 TB, the partition may not be formed using the existing partition table. Accordingly, in a known format, whether or not the partition is formed in a space of 2 TB or more is checked. If the partition can be formed in the space of 2 TB or more, the area storing the parameters in the CHS format is considered as the extended area for the LBA format, whereby the size of the space storing the parameters in the LBA format is virtually increased by three bytes.

[Accessing of Contents on Virtual Disk Drive on the Basis of Index File]

Figure 8:
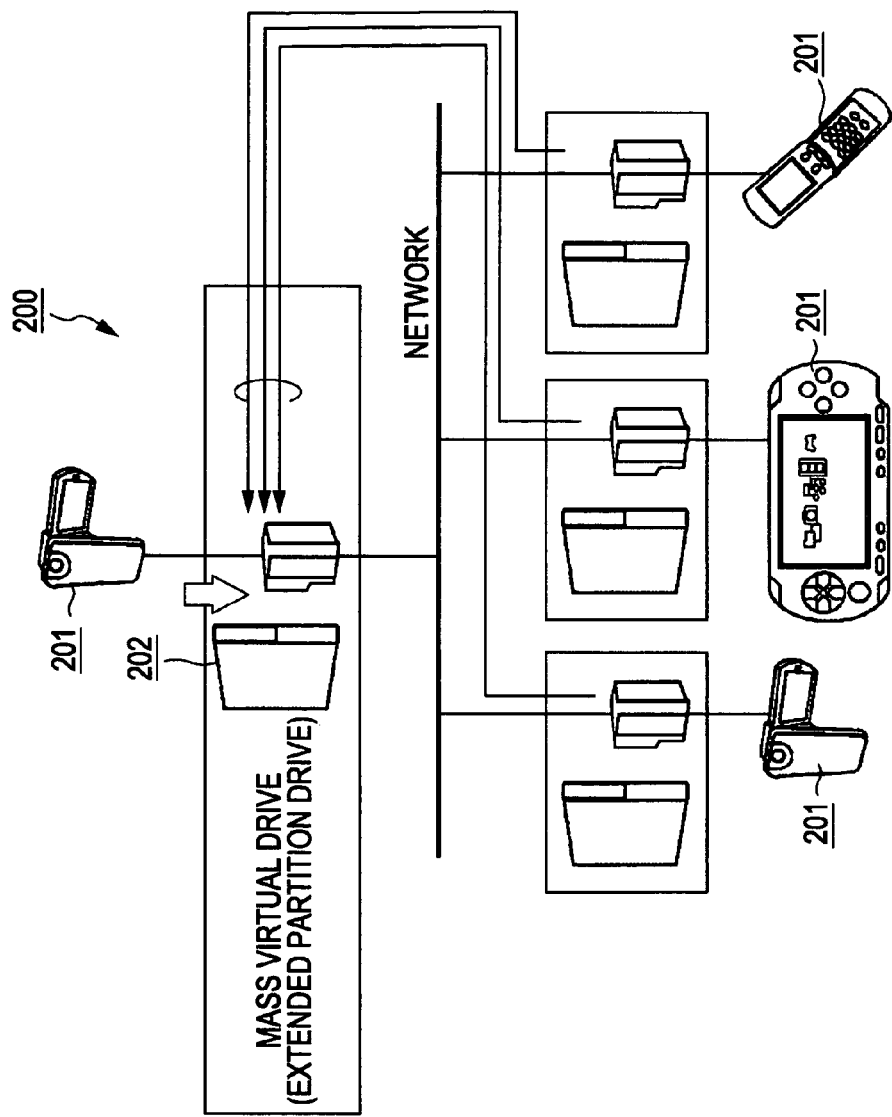
FIG. 8 is a block diagram showing a configuration of a virtual disk access system according to a second embodiment of the present invention.

FIG. 8 shows a configuration of a virtual disk access system according to a second embodiment of the present invention. As shown in FIG. 8, a virtual disk access system 200 includes a virtual drive management device 202 and local terminal servers 201. The virtual drive management device 202 and the local terminal servers 201 are connected each other via a network.

Figure 9:
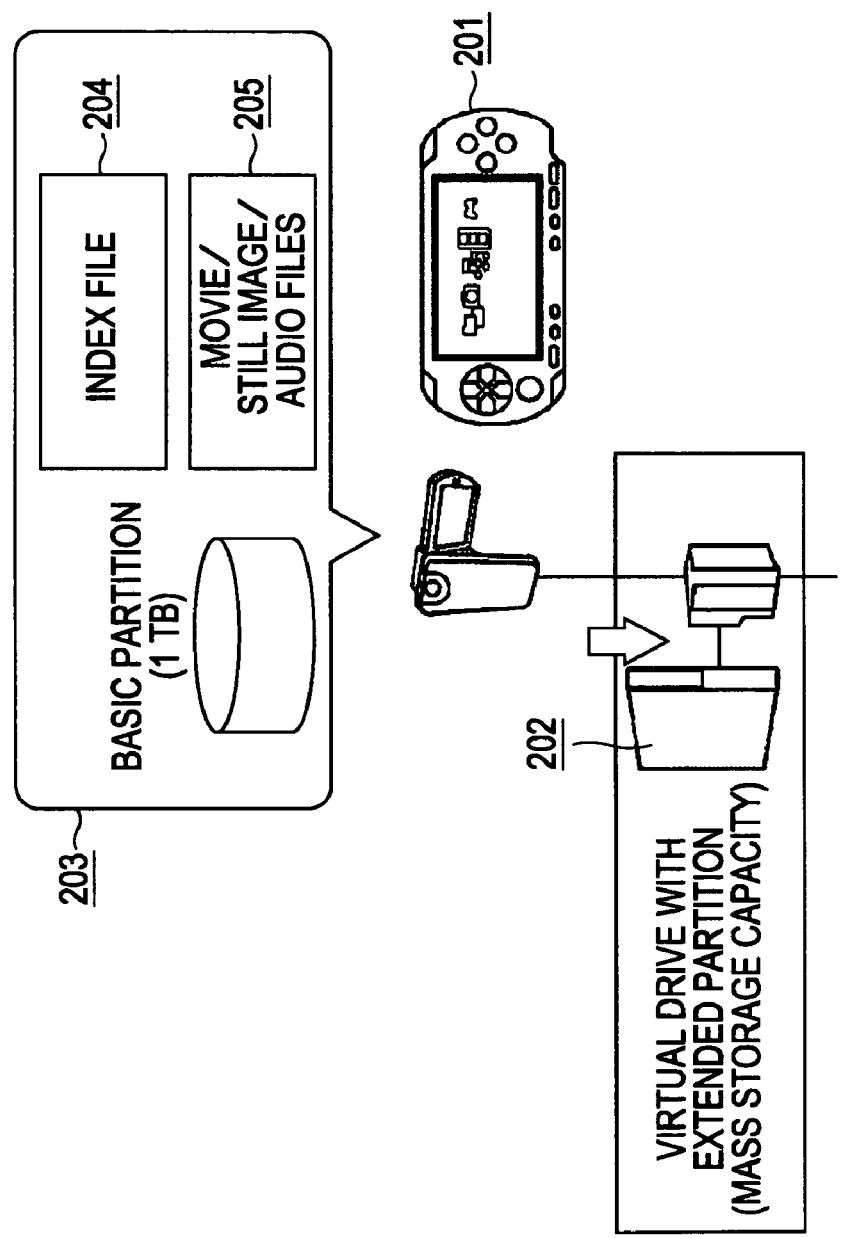
FIG. 9 is a block diagram showing a configuration of a local terminal server.

As shown in FIG. 9, the local terminal servers 201 are mobile devices such as camcorders, digital cameras, or video players. Each of the local terminal servers 202 includes or is connected to a storage unit having a capacity of at least 1 TB. The local terminal servers 201 alone are capable recording and playing back video and audio data, when connected to a network interface device, the local terminal servers 201 function as servers. Each of the local terminals servers 201 has a basic partition 203 of a drive, which is referred to as a drive #A. On the other hand, the virtual drive management device 202 have an extended partition 210 of a drive, which is referred to as a drive #B.

Figure 10:
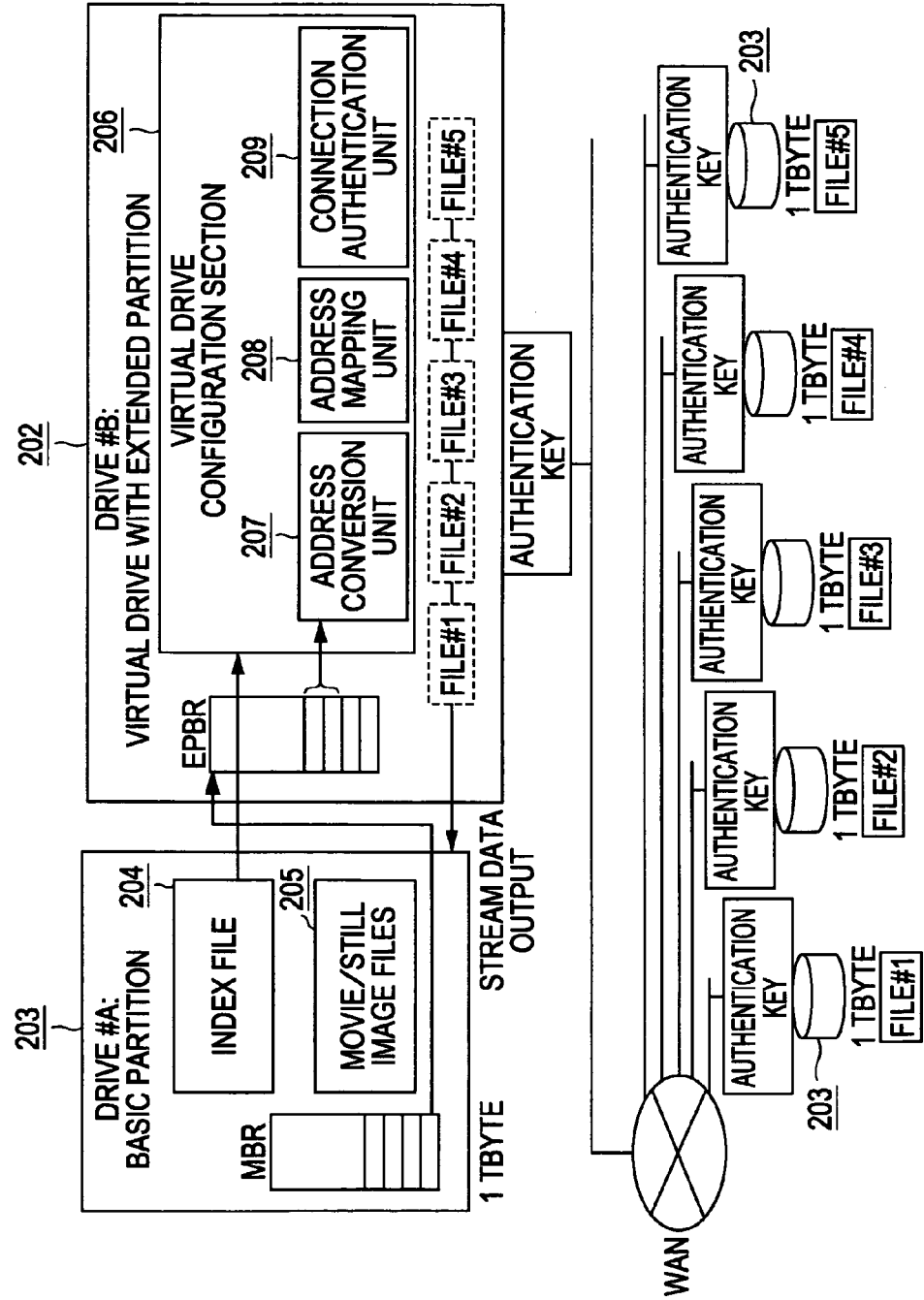
FIG. 10 is a block diagram showing a configuration of a virtual disk access system according to a second embodiment of the present invention.

As shown in FIG. 10, an index file 204 and movie/still image/audio files 205 are stored in the basic partition 203. As shown in FIG. 3, the index file 204 is composed of three kinds of file, i.e., a property file, a thumbnail file, and a title information file.

Suppose that a name of the property file is, for example, "Index0001.INP". In the explanation of the embodiment of the present invention, the property file has an index function to indicate entries for chapters. The property file is an entry information file for the chapters in each stream file, i.e., a title. In the embodiment of the present invention, the property file includes a drive specification descriptor that allows accessing of files recorded in a partition that is considered as a separate drive by dividing a storage space. Accordingly, the chapter in the stream file can be specified from the different drive.

As shown in FIG. 10, the storage space that the virtual drive management device 202 manages is divided into the drive #A and the drive #B. The drive #A corresponds to the basic partition 203, and includes an MBR and an index file 204. The drive #B corresponds to the extended partition 210. The virtual drive management device 202 includes a virtual drive configuration section 206. The virtual drive configuration section 206 further includes an address conversion unit 207, an address mapping unit 208, and a connection authentication unit 209. The address conversion unit 207 converts an LBA address in the extended partition into an IP (Internet Protocol) address of a destination. The address mapping unit 208 assigns a name of the stream file to the address of a chapter. The connection authentication unit 209 performs an authentication operation of the local terminal servers 201 over the network.

The address mapping unit 208 accesses the stream files recorded on each drives, and reads out the file names. Here, the maximum of $2^{25}$ drives are connectable. The address mapping unit 208 automatically performs a mapping operation. More specifically, the address mapping unit 208 assigns the LBA address as the chapter address to the accessed and obtained file names so as to prepare the access to the chapter.

Accordingly, even if the file access to the file stored in the drive is performed via the network, the stream file can be freely read out by performing the chapter access operation on the mass virtual drive using the property file of the index file 204.

Figure 11:
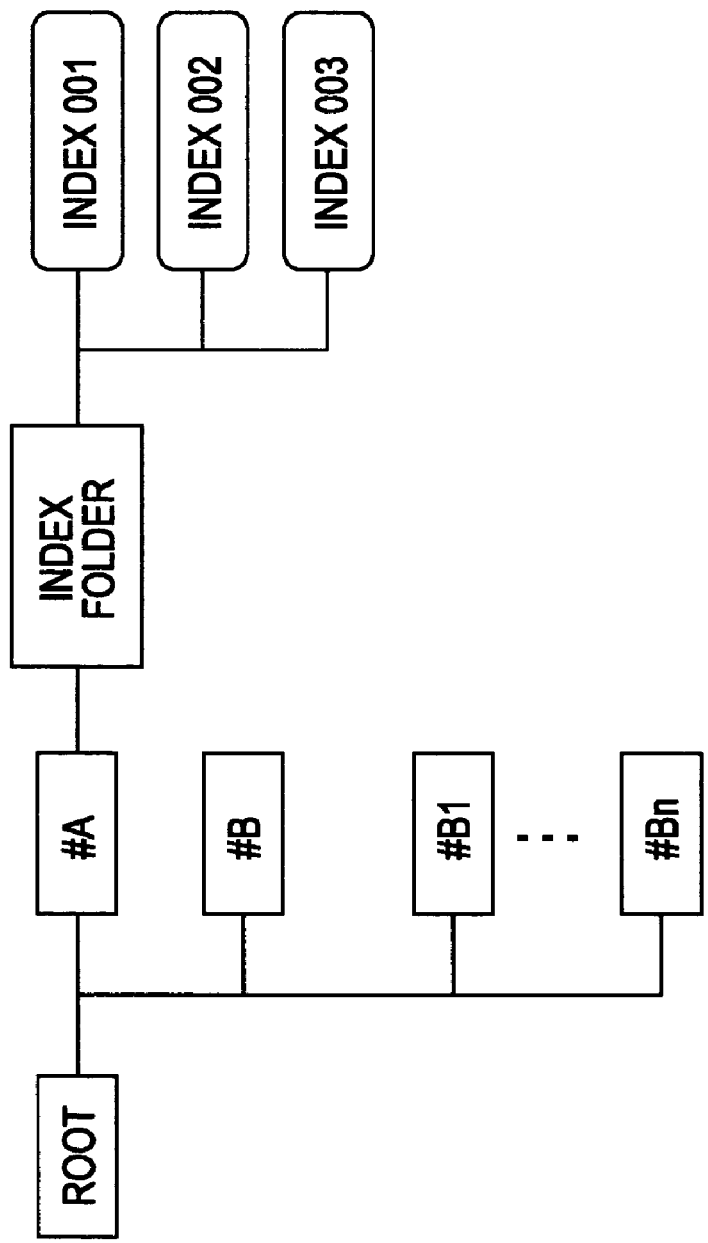
FIG. 11 is a schematic diagram showing a file specification screen.

FIG. 11 is a conceptual diagram showing a path tree used when the content file, thumbnail file, and title information file are specified on the basis of the property file. The FIG. 11 shows a path from a root directory to the drive #A (i.e., basic partition 203), the drive #B (i.e., extended partition 210), and other drives #B1 to #Bn (i.e., extended partitions 210) connected via the network. The property file resides in a directory for the index file 204 in the drive #A. The content entry information for each chapter of the stream files is recorded in the property file.

The video stream files are stored in the drives #B1 to #Bn. The titles of the video stream files are displayed in the drives #B1 to #Bn. The property file includes the information such as the tiles of the video stream files. Thus, if the title stored in the drives #B1 to #Bn is selected, the extended partition 210 connected via the network is accessed on the basis of the entry information in the property file 204.

Figure 12:
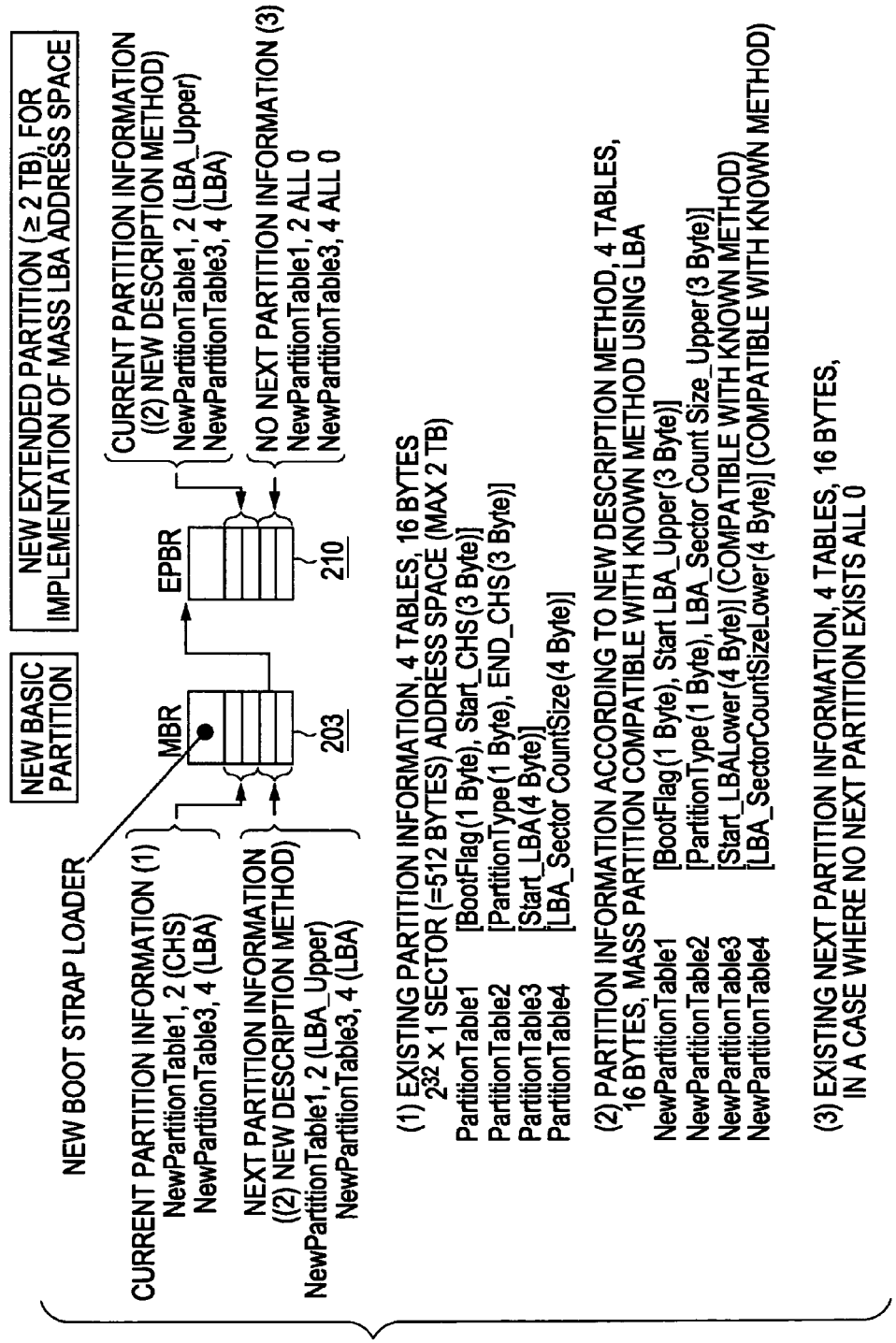
FIG. 12 is a conceptual diagram showing a structure of a partition table used when an extended partition according to a new method is formed in a virtual drive management device.

Suppose that, in the virtual drive management device 202, the drive #A corresponds to the basic partition according to a new method, whereas the drive #B corresponds to the extended partition according to the new method. As shown in FIG. 12, in the description indicating the extended partition according to the new method, the 3-byte field for holding the start CHS address is used for holding 3-high-order bytes of the start LBA address. Furthermore, the 3-byte area used for holding the end CHS address is used for holding 3-high-order-byte extended address, which indicates the total number of LBAs in the partition.

An MBR resides in the basic partition 203. A bootstrap loader is written at the first part of the MBR. Following the bootstrap loader, four tables having the current partition information and another four tables having the next partition information are written. The current partition information is composed of four tables, which is 16 bytes long, and has the same configuration as that of the basic partition shown in FIG. 6.

The next partition information is composed of four tables, which is 16 bytes long, and holds partition information described in the new method. A partition table 1 includes information on a boot flag (1 byte) and high-order bytes of a start LBA address (3 bytes). A partition table 2 includes information on a partition type (1 byte) and high-order bytes of a size the partition in the LBA format (3 bytes). A partition table 3 includes information on low-order bytes of the start LBA address (4 bytes). A partition table 4 includes information on low-order bytes of the size of the LBA (4 bytes).

An EPBR (Extended Partition Boot Record) resides in the drive #B, i.e., the extended partition 210. The first part of the EPBR includes no bootstrap loader. Following the first part, four tables having the current partition information according to the new method and another four tables having the next partition information are written.

The current partition information in the extended partition 210 is composed of four tables, which are 16 bytes long. The partition information according to the new method is written in the partition tables 1, 2, 3, and 4. The next partition information in the extended partition 210 is composed of four tables, which are 16 bytes long. In this example case, since no extended partition exists, all values of the four tables are set to zero.

In the new method, since the data area for the 3-high-order bytes (i.e., 24 bits) is added, the new method is compatible for the partition having the maximum of $2^{56}$ sectors. Suppose the one sector in a hard disk is equivalent to 512 ($2^9$) bytes. In such a case, the new method is capable of handling the hard disk having the capacity of $2^{65}$ bytes.

Here, suppose local terminal servers 201 constituting a network community each having a 1 TB ($=2^{40}$ bytes) capacity are connected each other via a wide area network. The maximum of $2^{25}$ (i.e., approximately 3355-million) drives can be connected. A plurality of (up to $2^{25}$) 1 TB drives may be configured to be connected and authenticated via the network so as to form one extended virtual drive.

As described above, in the virtual disk access system adopting the embodiment of the present invention, each member of the network community stores the index file 204 and the stream files for public messages in their own 1 TB basic drive. The 1 TB drives are connected each other to form the virtual drive. The stream files recorded on each drive having an IP address assigned for each access destination can be accessed on the basis of the property file of the index file 204 stored in the basic partition 203 via the network. This allows a user to freely play the chapter of the stream files stored in the remote drive as if the stream files were stored in their own drive.

Figure 13:
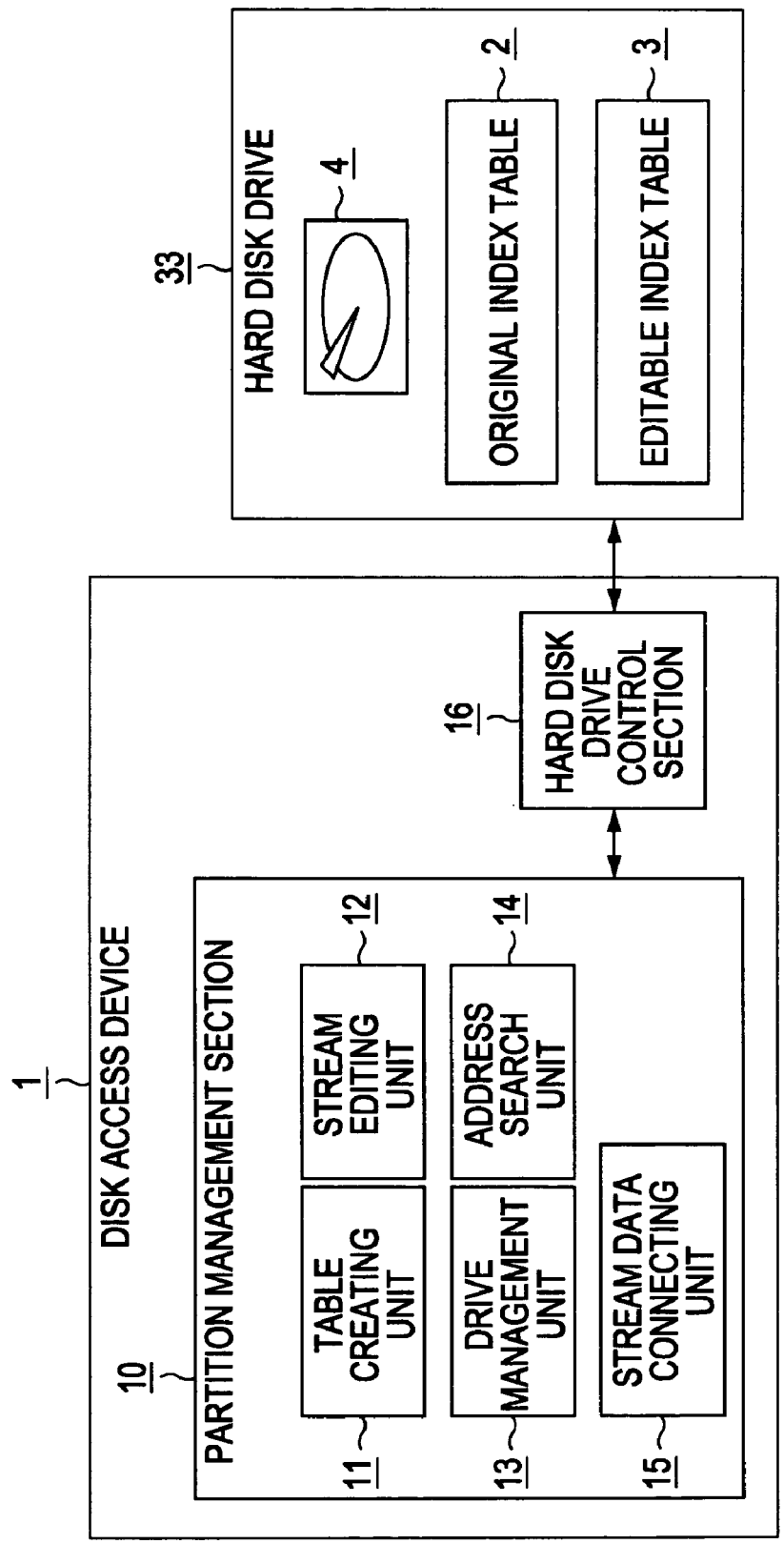
FIG. 13 is a block diagram showing a configuration of a disk access device adopting a second embodiment of the present invention.

A disk access device according to a third embodiment of the present invention will be described next. FIG. 13 shows a principle configuration of a disk access device 1 adopting the embodiment of the present invention. The disk access device 1 includes a partition management section 10 that manages the data files recorded in a partition according to a new method (described below).

The partition management section 10 further includes a table creating unit 11, a stream editing unit 12, a drive management unit 13, an address search unit 14, and a stream data connecting unit 15. The table creating unit 11 creates an original index table 2. The stream editing unit 12 creates an editable index table 3. The drive management unit 13 manages drive letters. The address search unit 14 searches for a sector storing the stream data. The stream data connecting unit 15 connects the stream data that has been discontinued by an edition operation.

Figure 14:
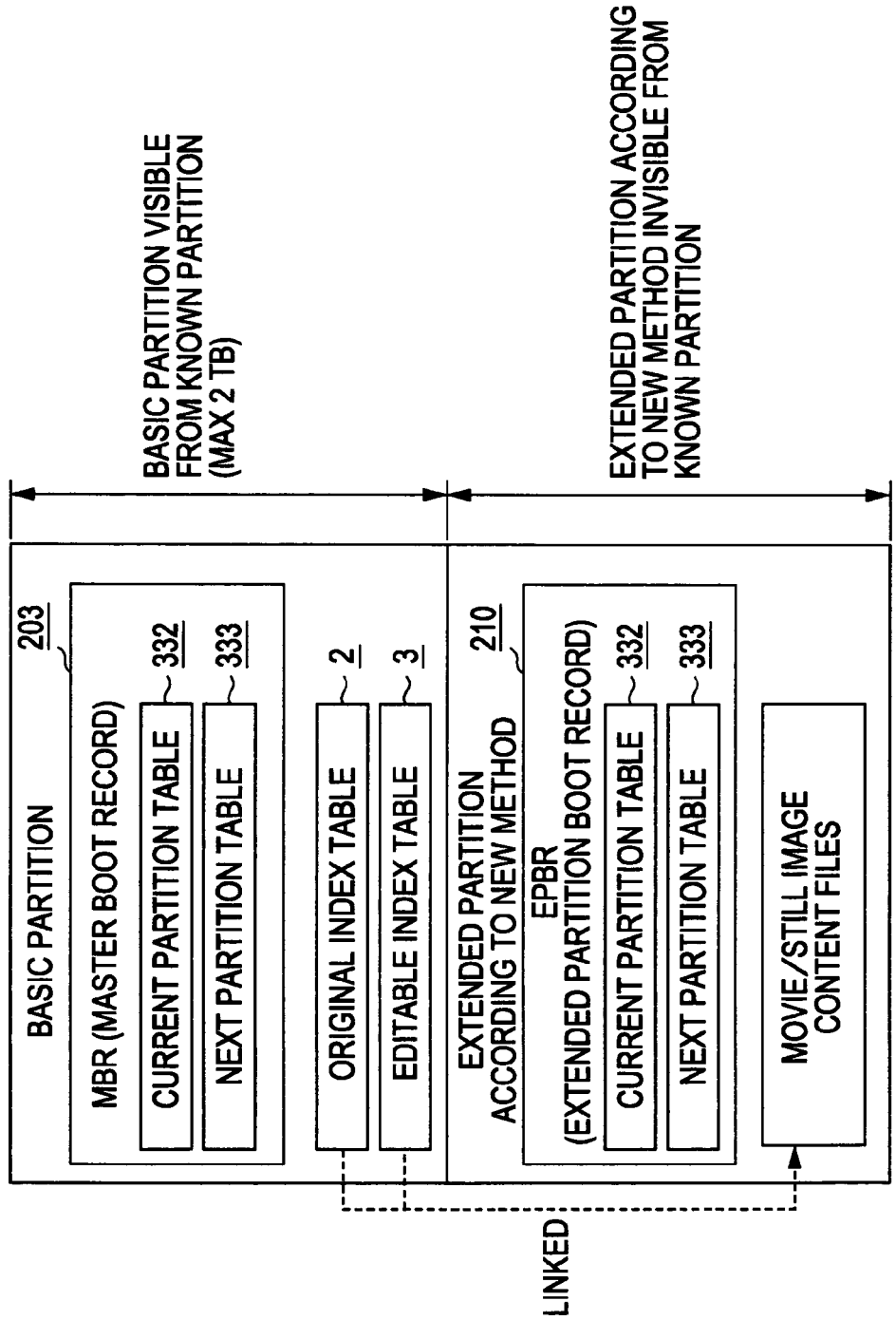
FIG. 14 is a conceptual diagram showing an association between an index file and an extended partition according to a new method invisible from a known system.

The disk access device 1 is connected to a hard disk drive 33 via a hard disk drive control section 16. As shown in FIG. 14, an MBR (Master Boot Record) resides in a first sector of a hard disk 4, which is a recording medium in the hard disk drive. The MBR includes a basic partition table 332 and an extended partition table 333 according to the new method.

The basic partition table 322 is a generally-used partition table, and includes information on a boot flag (1 byte), a CHS start sector (3 bytes), a partition type (1 byte), a CHS end sector (3 bytes), an LBA start sector (4 bytes), and a partition size (4 bytes).

The extended partition table 333 uses the area storing parameters in the CHS format, i.e., the redundant area in the basic partition, to manage the hard disk 4 having the capacity exceeding 2 TB. The area storing the parameters in the CHS format is used for storing the parameters in the LBA format, thus extending the size of the storage area for LBA format from 4 bytes to 7 bytes. Accordingly, a partition can be formed on the hard disk whose capacity is exceeding 2 ($2^{41}$) TB.

Following the MBR, the basic partition and the extended partition are formed on the basis of the basic partition table and the extended partition table, respectively. Since the area in which the basic partition is formed is recognizable by the existing system, it is denoted as a visible area. On the other hand, since the area in which the extended partition is formed is unrecognizable by the existing system, it is denoted as an invisible area.

Figure 15:
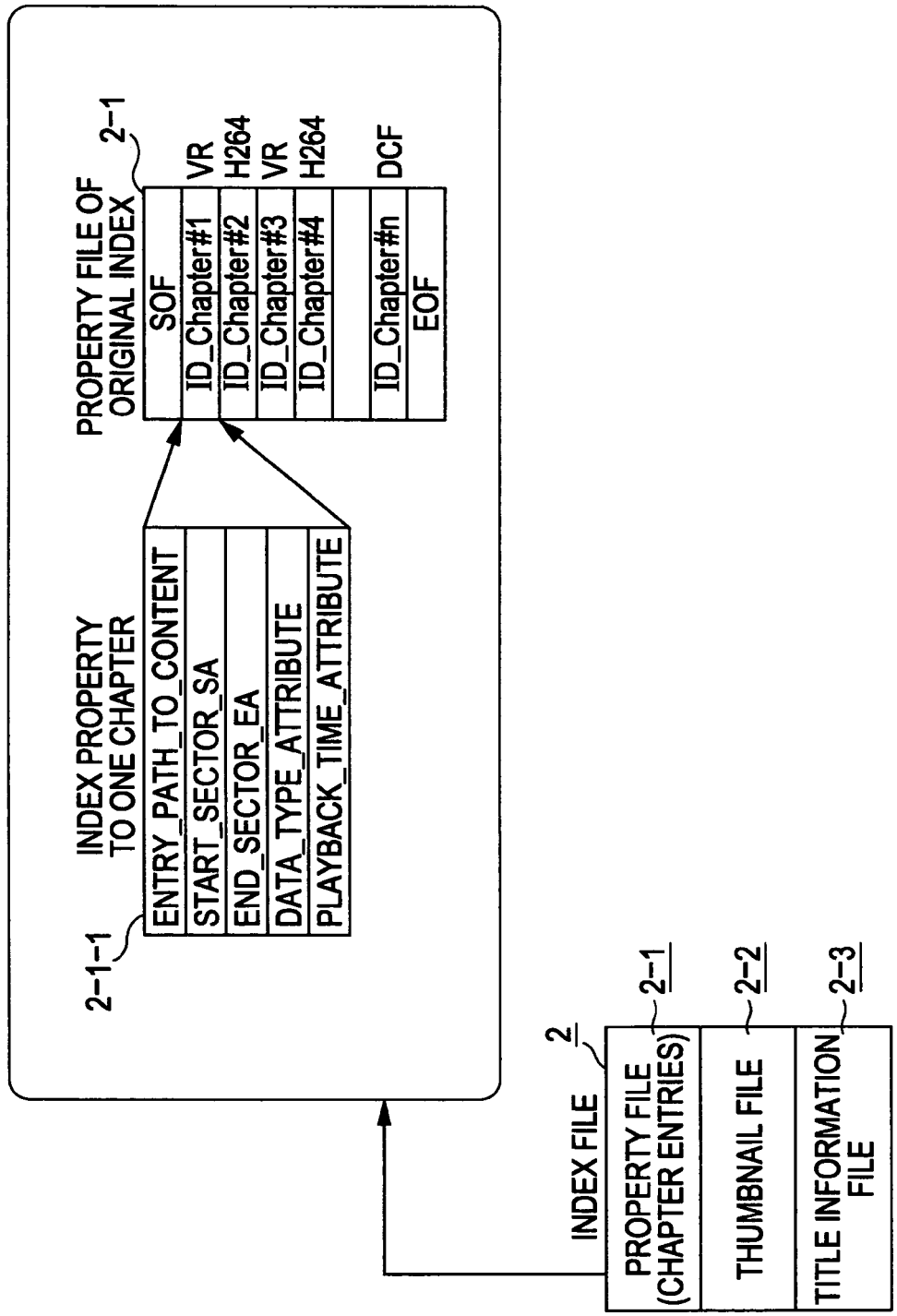
FIG. 15 is a conceptual diagram showing a structure of an original index file and an index property file.
Figure 16:
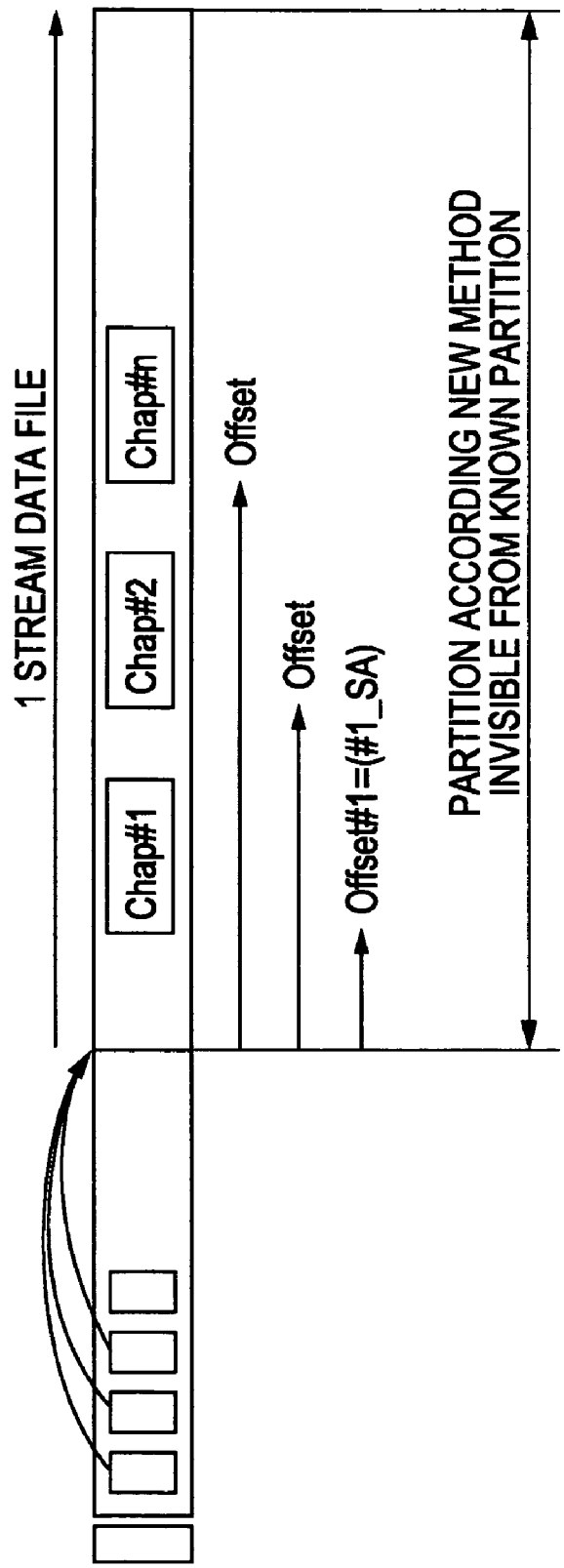
FIG. 16 is a conceptual diagram showing a logical structure of a hard disk formatted according to a new extended partition.

The table creating unit 11 creates the original index table 2. The original index table 2 includes a plurality of indexes 2-1-1. As shown in FIG. 15, each of the indexes 2-1-1 has information on the start sector and the end sector of the stream file, a data type, user data, etc. As shown in FIG. 16, the start and end sectors are expressed as offsets from the first sector of the invisible area. The user data includes various file data that indicates the thumbnail data of the stream data and a content of the stream data. The data type indicates the application format such as DVD-VF (video format), DVD-VR (video recording format), and H264, or the data type of the video stream having the system stream configuration and the navigation configuration that comply with the video object unit.

The stream data is managed using the indexes 2-1-1 by a user's access unit, which is a unit that the user can direct the reading out of the data. For example, the user's access unit corresponds to a chapter in the DVD-VF, DVD-VR, DVD+RW-Video, a clip in the H264, a song in the case of the audio data, and a still image.

Figure 17:
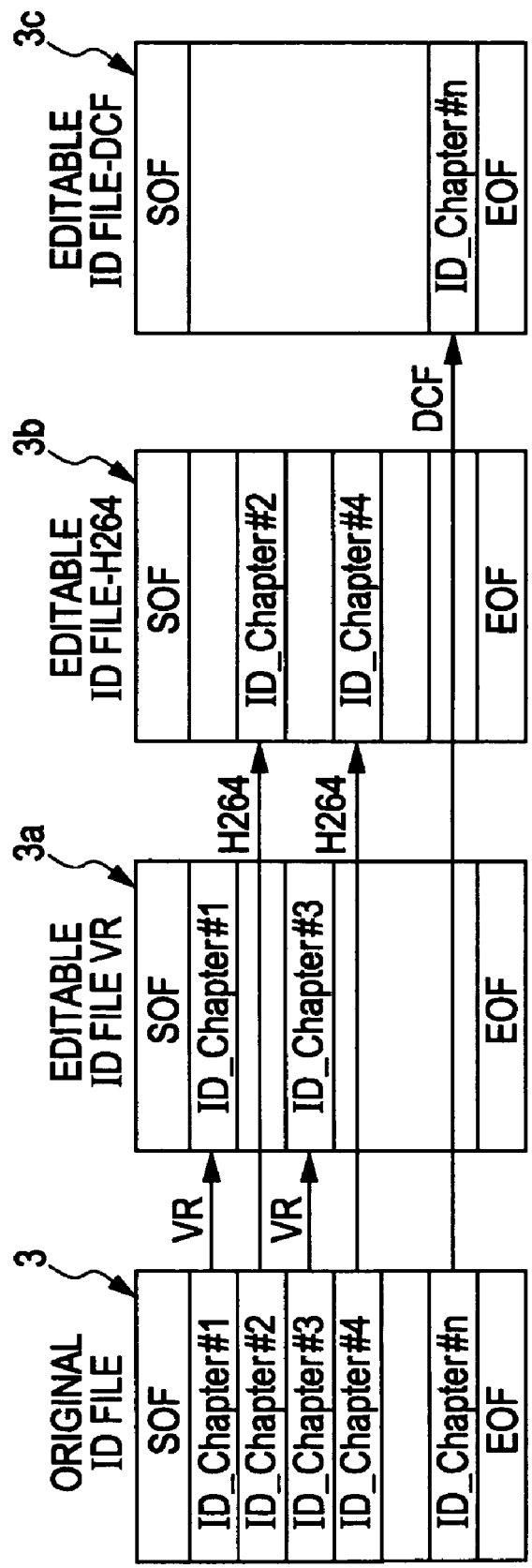
FIG. 17 is a conceptual diagram showing a structure of an editable index file table.

The stream editing unit 12 creates the editable index table 3. The editable index table 3 includes indexes 2-1-1 having the same data type. FIG. 17 shows an editable index table 3a including the indexes 2-1-1 of the DVD-VR, an editable index 3b including the indexes 2-1-1 of H264, and an editable index table 3c including the indexes 2-1-1 of DCF (Design rule for Camera File system).

An order in the editable index table 3 determines a playback order of the stream data. For example, in the case of using the editable index table 3 shown in FIG. 17, the stream is played back in an order of ID_Chapter#1, ID_Chapter#2, and so on. Additionally, in the case of using the editable table 3b, the stream is played back in an order of ID_Chapter#2, ID_Chapter#4, and so on.

Figure 18:
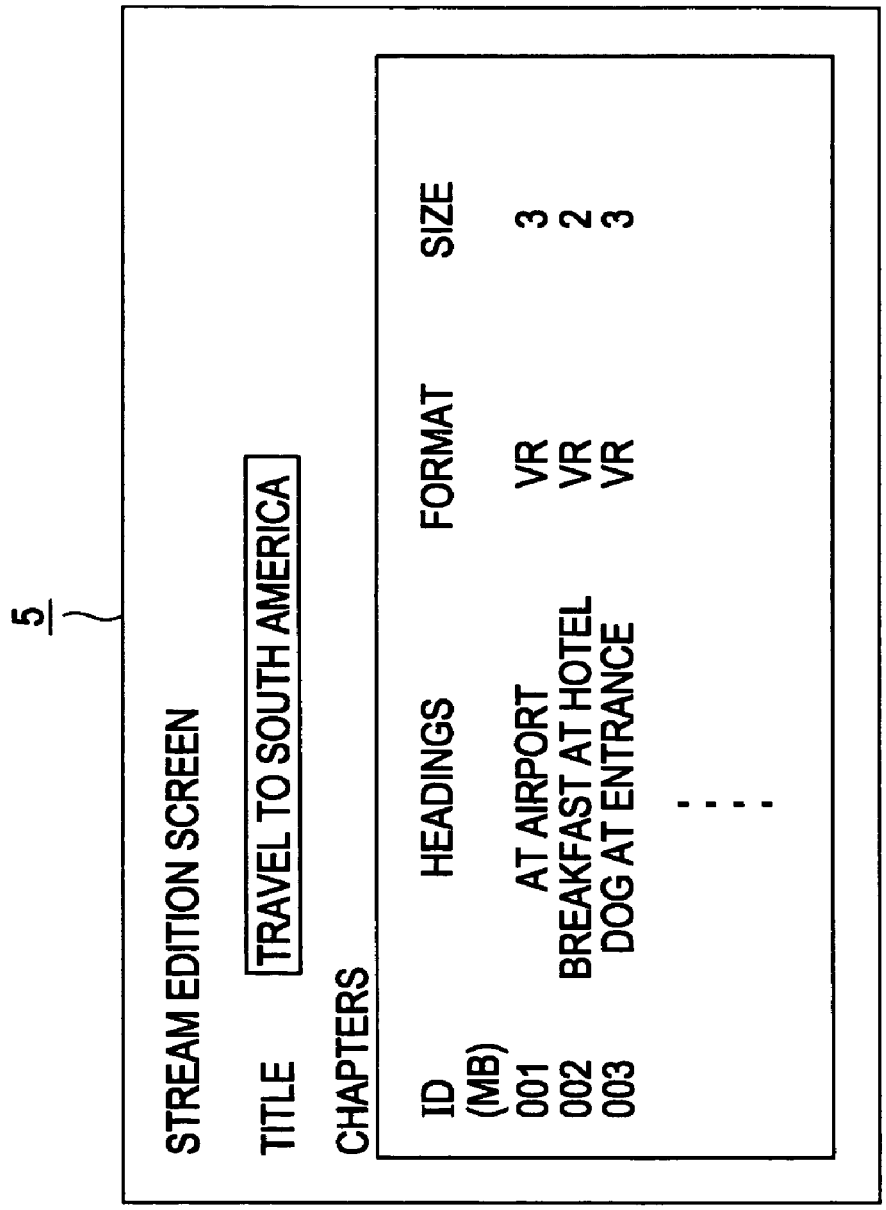
FIG. 18 is a schematic diagram showing an example of a stream edition screen used when editing an editable index file table.

The stream editing unit 12 changes the playback order in the editable index table 3 according to the user's directions. FIG. 18 shows an example of a stream edition screen 5. IDs of indexes 2-1-1, headings of chapters or clips, data types (formats), sizes are shown in the stream edition screen 5. The user performs an operation on the stream edition screen 5 to change the order of the indexes 2-1-1, delete and add the indexes 2-1-1. The stream editing unit 12 then creates the editable index table 3 where the user's operation on the screen is reflected.

The drive management unit 13 distinguishes between the files stored in the visible area and those stored in the invisible area using the drive letters. The drive letters are alphabets assigned to the drives. Generally, "A" is assigned to a floppy disk drive, "C", "D", and so on are assigned to a hard disk, and the alphabet that follows those assigned to the hard disk is assigned to a physical drive such as a CD-ROM drive. Different drive letters are assigned to each of the partitions in one hard disk.

For example, when the hard disk 4 has a basic partition and an extended partition formed thereon, the basic partition is recognized as a "C drive" and the extended partition is recognized as a "D drive". When the drive letter included in a file path is the drive letter, such as "D:\ . . . " assigned to the extended partition, the drive management unit 13 instructs the address search unit 14 to search the file stored in the extended partition. Accordingly, management of the file paths by the drive management unit 13 allows the files stored in the extended partition to be accessed using the file paths just like the files stored in the basic partition.

The address search unit 14 reads out information on the start sector and the end sector of the stream file to be played from the indexes 2-1-1 included in the editable index table 3, and outputs the information to the hard disk drive control section 16. The hard disk drive control unit 16 sends, to the HDD 33, a command to read out the data from the start sector to the end sector, which are read out by the address search unit 14. The HDD 33 in tern reads out the stream data to be played according to the command received from the hard disk drive control section 16.

The stream data may have discontinuity due to the change, deletion, and addition operations of the editable index table 3. In such a case, the stream data connecting unit 15 connects and plays the stream data having different STCs (System Time Clocks) across a plurality of stream data to be played back on the basis of the time management data appended to the stream data.

The stream data is recorded as closed GOPs. Each picture except for an I-picture is compressed using the content of the previous and following pictures in terms of time. Thus, if the stream data is recorded as open GOPs, the compressed data may not be separated in the middle thereof and the separated data may not be connected to other data to access the stream data in the middle thereof, or to edit the stream data. The stream data may not be separated or connected even at a boundary of the GOPs, since B-picture located between the I-picture and the following P-picture generally refers to the last P-picture from the previous GOP in the playback order although the I-picture stored in a storage medium such as a disc is located in the top of the GOP.

However, when the stream data is recorded as the closed GOPs, the B-picture does not refer to the data from the previous GOP. That is, the information is completed within a GOP. Thus, theoretically, the stream data separation and the access to the stream data at a given location are available for each video object unit including the GOP. Such a video/audio compressed recording stream is preferable for the embodiment. In this case, compression efficiency insignificantly reduces since the first B-picture in the GOP is incapable of referring to the last P-picture in the previous GOP. When the closed GOP is not used, the previous GOP also has to be read out, and the first B-picture in the playback order has to be decoded while referring the last P-picture in the last GOP, which reduces the quick response capability desired in the embodiment.

As described above, the disk access device 1 adopting the embodiment of the present invention creates, in the basic partition, the original index table 2 that associates the basic partition and the extended partition according to the new method. The disk access device 1 accesses the extended partition from the basic partition using the original index table 2.

Since the extended partition table 333 is a new technique, not all systems are compatible with the extended partition (hereinafter, referred to as an "extended system"). The systems incompatible with the extended partition (hereinafter, referred to as "existing system") is incapable of recognizing the extended partition table.

The disk access device 1 adopting the embodiment of the present invention allows the existing system incompatible with the new extended partition format to manage the data recorded in the new extended partition by accessing the new extended partition using the original index table 2 recorded on the basic partition.

As described above, the disk access device 1 adopting the embodiment of the present invention creates, in the visible partition of the hard disk 4, the original index table 2 that associates the visible partition and the invisible partition. Accordingly, even the system incompatible with the invisible partition can manage the stream data recorded on the invisible partition. In addition, using the editable index table 3, the video/audio stream data is managed by the user's access unit such as the chapters or the clips, which facilitates the edition operation performed by the user.

Figure 19:
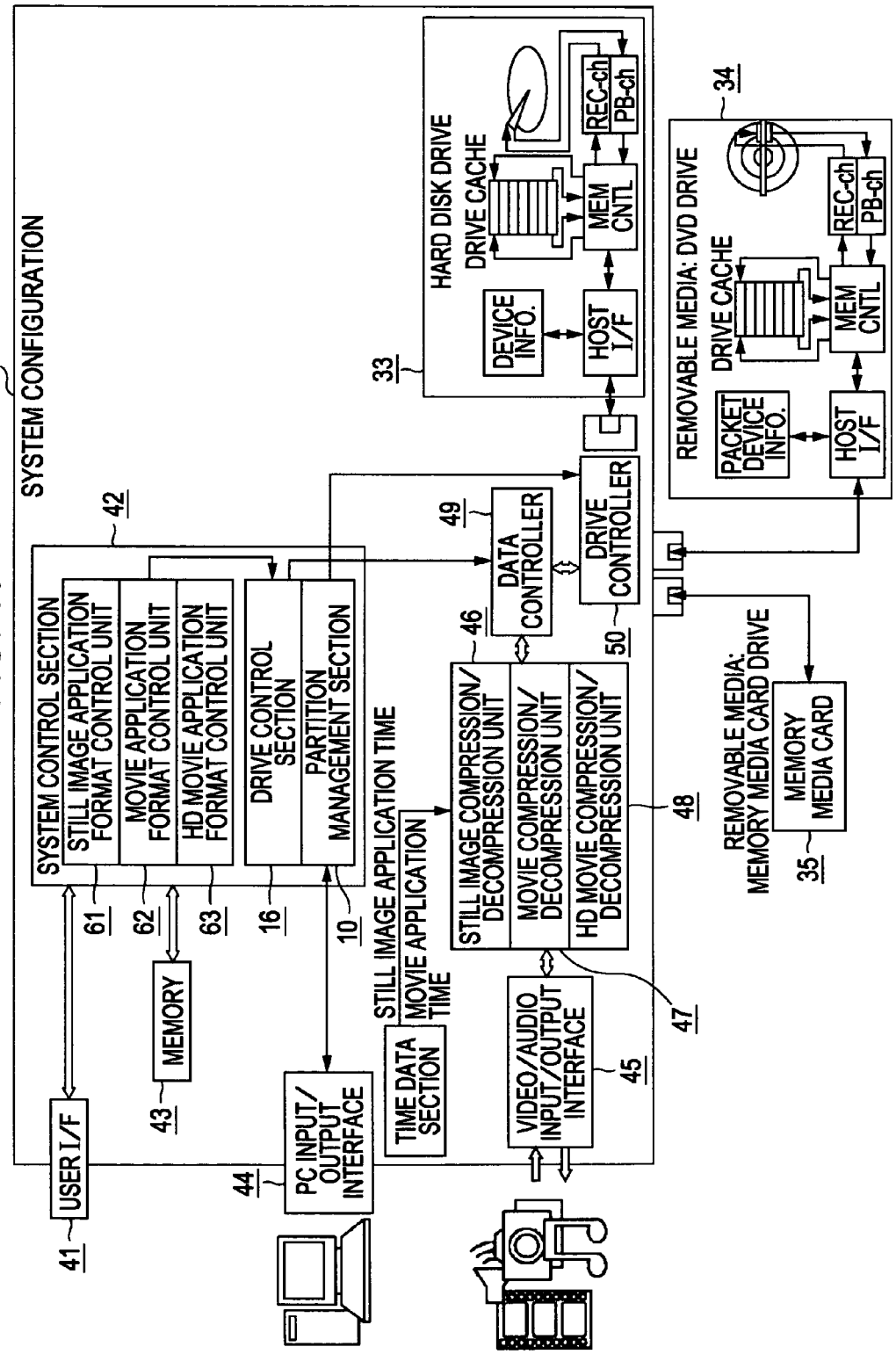
FIG. 19 is a block diagram showing a configuration of a video/audio local terminal server.

Now, a video/audio management server 40 utilizing the above-described partition management section 10 will be described. FIG. 19 is a block diagram showing an exemplary configuration of the video/audio management server 40. The video/audio management server 40 includes the partition management section 10, adopting the embodiment of the present invention, for managing the extended partition the embodiment of the present invention. The server 40 also includes a user interface 41 for accepting the users input operations, a system control section 42 for managing the format of the stream data files, and a memory 43 that serves as a work area of the system control section 42. The server 40 further includes an input/output interface 44 to the information devices such as personal computers, a video/audio input/output interface 44 to AV devices such as cameras and microphones. The server 40 also includes a still image compression/decompression unit 46 for compressing and decompressing the still images, a movie compression/decompression unit 47 for compressing and decompressing the movies, an HD (High Definition) movie compression/decompression unit 48 for compressing and decompressing the HD movies. The server 40 still further includes a data controller 49 that serve as a temporary storage area of the system data, and a drive controller 50 that outputs the data stored in the data controller 49 to the hard disk drive 33.

The video/audio management server 40 manages the video/audio data utilized by the information devices such as personal computers and the AV devices such as cameras, microphones, and televisions in an integrated fashion. The video/audio management server 40 is connected to the information devices and the AV devices through wire or wirelessly via the video/audio input/output interface 44 and the input/output interface 44.

The still image compression/decompression unit 46 compresses the still image data received from the AV devices. The movie compression/decompression unit 47 compresses the movie data received from the AV devices. The HD movie compression/decompression unit 48 compresses the HD movie data received from the AV devices.

A still image application format control unit 61 generates management information such as file header information to converts the compressed still image data into a given still image application format. The still image application format may be, for example, a JPEG (Joint Graphics Experts Group) format, JFIF (Jpeg File Interchange Format), Exif (Exchangeable Image file Format), and TIFF (Tag Image File Format). A movie application format control unit 62 generates management information to converts the compressed movie data into a given movie application format such as, for example, an MPEG format. An HD movie application format control unit 63 generates management information to converts the compressed HD movie data into a given HD movie application format such as, for example, H264.

The data controller 49 temporary stores the compressed video/audio data and the management information of the video/audio data, and prepares to start recording. The drive control section 16 obtains information from firmware of the drive, monitors the state of the medium within the drive according to the ATAPI (AT Attachment Packet Interface) protocol. The drive control section 16 gives instructions to start playback operation or to start recording operation on the basis of the state of the medium within the drive. The drive controller 50 controls the recording operation to record cell RUV (Recording Unit Video Object) in which a plurality of the video object units are packetized. The video object unit includes a GOP in which the video/audio data is stored as the system stream. For example, whenever several tens of MB of stream data is buffered, the drive controller 50 repeatedly controls the recording of the stream data on the hard disk 4.

The drive control section 16 receives, from the hard disk drive 33, the start sector and the end sector of the area where the video/audio data is recorded. The partition management section 10 creates the index 2-1-1 on the basis of the start sector and the end sector, and adds the index 2-1-1 to the original index table 2.

Upon completing the original index table 2, the partition management section 10 displays the stream edition screen 5 of the video/audio data. If the user instructs the deletion, addition, or sorting of the stream data on the stream edition screen 5, the partition management section 10 edits the editable index table 3 according to the instruction.

Upon receiving an instruction to play back the video/audio data from the user interface 41, the partition management section 10 searches for the start sector and the end sector in the order of the indexes 2-1-1 in the editable index table 3. The drive control section 16 instructs the hard disk drive 33 to read out the data recorded on the area indicated by the start sector and the end sector. The data controller 49 feeds the data read out from the hard disk drive 33 to one of the still image compression/decompression unit 46, the movie compression/decompression unit 47, and the HD movie compression/decompression unit 48. The still image compression/decompression unit 46 decompresses the read out compressed still image data. The movie compression/decompression unit 47 decompresses the read out compressed movie data. The HD movie compression/decompression unit 48 decompresses the read out compressed HD movie data. The video/audio management server 40 feeds the decompressed data to an LCD (Liquid Crystal Display) and a speaker via the video/audio interface 45.

It should be understood by those skilled in the art that various modifications, combinations, sub-combinations and alterations may occur depending on design requirements and other factors insofar as they are within the scope of the appended claims or the equivalents thereof.

The invention claimed is:

1. A data management device for managing a computer readable recording medium recorded with a partition table having information regarding a partition, and on which a plurality of drives are assigned using a partition description by referring to the partition table, the plurality of drives including a recording drive recorded with a basic playback unit included in a file and a management drive recorded with a property file having access information for the basic playback unit, the data management device comprising:
   an accessing section for accessing the basic playback unit recorded on the recording drive by referring to the property file recorded on the management drive,
   in which an extended partition is formed on the recording drive,
   in which the extended partition includes an extended partition boot record in which a first part thereof is without a bootstrap loader and immediately following the first part further includes a first plurality of tables having current partition information and a second plurality of tables having next partition information, and
   in which a first table of the first plurality of tables includes information on a boot flag and a start Cylinder Head Sector (CHS) address, a second table of the first plurality of tables includes information on a partition type and an end CHS address, a third table of the first plurality of tables includes information on a start Logical Block Addressing (LBA) address, and a fourth table of the first plurality of tables includes information on a partition size in LBA format.

2. The device according to claim 1, wherein a thumbnail file for the basic playback unit is further recorded on the management drive.

3. The device according to claim 1, wherein the file corresponds to a video/audio stream data file, and wherein the basic playback unit corresponds to a chapter.

4. The device according to claim 1, wherein a drive letter is assigned for a removable semiconductor memory using the partition description.

5. A data management device for managing a computer readable recording medium recorded with a partition table having information regarding a partition, and on which a basic partition and an extended partition are formed using a partition description, by referring to the partition table, the basic partition having recorded therein a property file having access information for a basic playback unit included in a file recorded on the extended partition, the data management device comprising:
   a mapping section for assigning a logical sector address to the recording medium connected via a network;
   a network address conversion section for converting address data assigned as the logical sector address into a network address of the recording medium connected via the network; and
   a chapter address conversion section for converting the access information indicated by the property file into a name of the file and for accessing the basic playback unit,
   in which the extended partition includes an extended partition boot record in which a first part thereof is without a bootstrap loader and immediately following the first part further includes a first plurality of tables having current partition information and a second plurality of tables having next partition information, and
   in which a first table of the first plurality of tables includes information on a boot flag and a start Cylinder Head Sector (CHS) address, a second table of the first plurality of tables includes information on a partition type and an end CHS address, a third table of the first plurality of tables includes information on a start Logical Block Addressing (LBA) address, and a fourth table of the first plurality of tables includes information on a partition size in LBA format.

6. A data management device for managing a computer readable recording medium that includes a basic partition table holding a start address of a partition and a size of the partition and an extended partition table according to a new method where a storage area for the start address and the partition size in the basic partition table is extended, and that is divided into the basic partition formed according to the basic partition table and an extended partition formed according to the extended partition table according to the new method, the data management device comprising:

an index file creating section for locating an index file in the basic partition and registering an index that associates a data file recorded in the extended partition and a storage area of the data file in the index file; and a data file searching section for searching for the storage area of the data file recorded in the extended partition on the basis of the index file, in which the extended partition includes an extended partition boot record in which a first part thereof is without a bootstrap loader and immediately following the first part further includes a first plurality of tables having current partition information and a second plurality of tables having next partition information, and in which a first table of the first plurality of tables includes information on a boot flag and a start Cylinder Head Sector (CHS) address, a second table of the first plurality of tables includes information on a partition type and an end CHS address, a third table of the first plurality of tables includes information on a start Logical Block Addressing (LBA) address, and a fourth table of the first plurality of tables includes information on a partition size in LBA format.

7. The device according to claim 6, further comprising:
an editable index file creating section for creating an editable index file in which the indexes of the data files of the same data type are gathered from the indexes included in the index file.

8. The device according to claim 7, further comprising:
an index file editing section for performing an addition operation, a deletion operation, and a sorting operation on the indexes included in the editable index file, wherein
the data file searching section searches for the storage area of the data file according to the order of the indexes in the editable index file.

9. The device according to claim 6, further comprising:
a drive management section for determining, when reading out of the data file is instructed, whether the data file is recorded in the basic partition or in the extended partition based on a drive letter that indicates the location of the data file, and for causing, when the data file is determined to be recorded in the extended partition, the data file searching section to search for the address of the data file.

10. The device according to claim 6, further comprising:
a data file creating unit for creating a data file that is a recording unit of stream data, wherein
the index file creating section sequentially creates the index for the data file constituting the stream data, and sequentially registers the index in the index file.

11. A method for managing a computer readable recording medium that includes a basic partition table storing a start address of a partition and a size of the partition and an extended partition table where a storage area for the start address and the partition size in the basic partition table is extended, and that is divided into a basic partition formed according to the basic partition table and an extended partition formed according to the extended partition table, the method comprising:

locating an index file in the basic partition;
recording a data file in the extended partition;
creating an index associating a storage area of the data file recorded in the extended partition and the basic partition; and
registering the index in the index file,
in which the extended partition includes an extended partition boot record in which a first part thereof is without a bootstrap loader and immediately following the first part further includes a first plurality of tables having current partition information and a second plurality of tables having next partition information, and
in which a first table of the first plurality of tables includes information on a boot flag and a start Cylinder Head Sector (CHS) address, a second table of the first plurality of tables includes information on a partition type and an end CHS address, a third table of the first plurality of tables includes information on a start Logical Block Addressing (LBA) address, and a fourth table of the first plurality of tables includes information on a partition size in LBA format.

* * * * *